United States Patent
Santhanam et al.

(10) Patent No.: US 12,224,902 B2
(45) Date of Patent: Feb. 11, 2025

(54) TECHNIQUES FOR PROVIDING ASSISTANCE INFORMATION FOR REDUCED MIMO LAYERS

(71) Applicant: QUALCOMM Incorporated, San Diego, CA (US)

(72) Inventors: Arvind Vardarajan Santhanam, San Diego, CA (US); Brian Clarke Banister, San Diego, CA (US); Kuo-Chun Lee, San Diego, CA (US); Aamod Khandekar, San Diego, CA (US); Enoch Shiao-Kuang Lu, San Diego, CA (US); Satashu Goel, San Diego, CA (US); Daniel Amerga, San Diego, CA (US); Karthik Venkatram, San Diego, CA (US); Subashini Krishnamurthy, San Diego, CA (US); Xuepan Guan, San Diego, CA (US); Mouaffac Ambriss, San Diego, CA (US); Peter Pui Lok Ang, San Diego, CA (US); James Francis Geekie, Carlsbad, CA (US); Sasikanth Reddy Adapala, Poway, CA (US); Sundaresan Tambaram Kailasam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 17/143,107

(22) Filed: Jan. 6, 2021

(65) Prior Publication Data
US 2022/0217042 A1 Jul. 7, 2022

(51) Int. Cl.
*H04L 41/0816* (2022.01)
*H04B 7/0413* (2017.01)
(Continued)

(52) U.S. Cl.
CPC ....... *H04L 41/0816* (2013.01); *H04B 7/0413* (2013.01); *H04W 24/08* (2013.01); *H04W 72/20* (2023.01); *H04W 72/51* (2023.01)

(58) Field of Classification Search
None
See application file for complete search history.

(56) References Cited

U.S. PATENT DOCUMENTS

| | | | |
|---|---|---|---|
| 10,051,511 B1 * | 8/2018 | Mehta | H04B 7/0413 |
| 2015/0105062 A1 * | 4/2015 | Quan | H04W 76/27 |
| | | | 455/418 |

(Continued)

FOREIGN PATENT DOCUMENTS

| | | | | |
|---|---|---|---|---|
| WO | WO-2021028450 A1 * | 2/2021 | | H04B 7/0452 |
| WO | WO-2021180330 A1 * | 9/2021 | | |

(Continued)

*Primary Examiner* — Jenkey Van
(74) *Attorney, Agent, or Firm* — Holland & Hart LLP

(57) ABSTRACT

Methods, systems, and devices for wireless communications are described. In some systems, a user equipment (UE) may transmit assistance information to a base station to request an update or a modification to one or more communication parameters configured at the UE. Such communication parameters may include a quantity of uplink multiple-input multiple-output (MIMO) layers, a quantity of downlink MIMO layers, a minimum scheduling offset, a maximum quantity of component carriers, or a maximum aggregated bandwidth for a secondary cell group (SCG). In some implementations, the UE may transmit the assistance information requesting the update or modification to one or more of such communication parameters based on detecting that the UE satisfies one or more triggering conditions or thresholds.

30 Claims, 18 Drawing Sheets

(51) Int. Cl.
*H04W 24/08* (2009.01)
*H04W 72/20* (2023.01)
*H04W 72/51* (2023.01)

(56) References Cited

U.S. PATENT DOCUMENTS

2019/0215729 A1* 7/2019 Oyman ............... H04L 65/1016
2020/0145986 A1* 5/2020 Park .................. H04W 72/0413
2022/0104002 A1* 3/2022 Marupaduga ........... H04W 8/24
2022/0104053 A1* 3/2022 Ye ........................ H04W 24/10
2022/0167187 A1* 5/2022 Jia ........................... H04L 41/16
2022/0304024 A1* 9/2022 Maleki ................. H04B 7/0486

FOREIGN PATENT DOCUMENTS

WO    WO-2022082458 A1 * 4/2022
WO    WO-2022083327 A1 * 4/2022

\* cited by examiner

TECHNIQUES FOR PROVIDING ASSISTANCE INFORMATION FOR REDUCED MIMO LAYERS

FIELD OF TECHNOLOGY

The present disclosure relates to wireless communications, including techniques for providing assistance information for one or more communication parameters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for providing assistance information for one or more communication parameters. For example, a user equipment (UE) may provide a base station with assistance information to request an adjustment or modification to one or more communication parameters configured at the UE, such as a quantity of uplink multiple-input multiple-output (MIMO) layers, a quantity of downlink MIMO layers, a minimum scheduling offset, a quantity of component carriers, or an aggregated bandwidth for a secondary cell group (SCG). In some examples, for instance, the UE may transmit the assistance information to request a reduction of one or both of the quantity of uplink MIMO layers or downlink MIMO layers configured for communications between the UE and the base station, an increase of the minimum scheduling offset configured at the UE, or a reduction of one or both of the quantity of component carriers or the aggregated bandwidth for the SCG configured at the UE. In some implementations, the UE may transmit the assistance information based on satisfying one or more trigger conditions or thresholds at the UE.

A method for wireless communication at a UE is described. The method may include receiving, from a base station, a configuration for reporting assistance information based on a capability of the UE, transmitting, to the base station, assistance information associated with a quantity of uplink MIMO layers based on the UE satisfying a first predetermined trigger threshold, and receiving, from the base station, control signaling indicating a re-configuration of the quantity of uplink MIMO layers based on the assistance information associated with the quantity of uplink MIMO layers.

An apparatus for wireless communication at a UE is described. The apparatus may include a processor, memory in electronic communication with the processor, and instructions stored in the memory. The instructions may be executable by the processor to cause the apparatus to receive, from a base station, a configuration for reporting assistance information based on a capability of the UE, transmit, to the base station, assistance information associated with a quantity of uplink MIMO layers based on the UE satisfying a first predetermined trigger threshold, and receive, from the base station, control signaling indicating a re-configuration of the quantity of uplink MIMO layers based on the assistance information associated with the quantity of uplink MIMO layers.

Another apparatus for wireless communication at a UE is described. The apparatus may include means for receiving, from a base station, a configuration for reporting assistance information based on a capability of the UE, means for transmitting, to the base station, assistance information associated with a quantity of uplink MIMO layers based on the UE satisfying a first predetermined trigger threshold, and means for receiving, from the base station, control signaling indicating a re-configuration of the quantity of uplink MIMO layers based on the assistance information associated with the quantity of uplink MIMO layers.

A non-transitory computer-readable medium storing code for wireless communication at a UE is described. The code may include instructions executable by a processor to receive, from a base station, a configuration for reporting assistance information based on a capability of the UE, transmit, to the base station, assistance information associated with a quantity of uplink MIMO layers based on the UE satisfying a first predetermined trigger threshold, and receive, from the base station, control signaling indicating a re-configuration of the quantity of uplink MIMO layers based on the assistance information associated with the quantity of uplink MIMO layers.

In some examples of the method, apparatuses, and non-transitory computer-readable medium described herein, transmitting the assistance information associated with the quantity of uplink MIMO layers may include operations, features, means, or instructions for transmitting an indication of a first quantity of uplink MIMO layers less than a second quantity of uplink MIMO layers associated with the capability of the UE.

In some examples of the method, apparatuses, and non-transitory computer-readable medium described herein, the assistance information associated with the quantity of uplink MIMO layers requests a reduction from the second quantity of uplink MIMO layers to the first quantity of uplink MIMO layers.

Some examples of the method, apparatuses, and non-transitory computer-readable medium described herein may further include operations, features, means, or instructions for receiving, from an application of the UE via a modem control interface, an indication that the UE satisfies the first predetermined trigger threshold, where transmitting the assistance information associated with the quantity of uplink MIMO layers may be based on the indication from the application of the UE.

In some examples of the method, apparatuses, and non-transitory computer-readable medium described herein, the first predetermined trigger threshold includes at least a latency condition of an application of the UE being less than a threshold latency, or an uplink throughput from the UE being less than a threshold throughput, or an uplink block error rate (BLER) being above a threshold BLER, or an amount of data in a buffer being less than a threshold amount of data, or any combination thereof.

Some examples of the method, apparatuses, and non-transitory computer-readable medium described herein may further include operations, features, means, or instructions for transmitting, to the base station, assistance information associated with a quantity of downlink MIMO layers based on the UE satisfying a second predetermined trigger threshold and receiving, from the base station, second control signaling indicating a re-configuration of the quantity of downlink MIMO layers based on the assistance information associated with the quantity of downlink MIMO layers.

In some examples of the method, apparatuses, and non-transitory computer-readable medium described herein, transmitting the assistance information associated with the quantity of downlink MIMO layers may include operations, features, means, or instructions for transmitting an indication of a first quantity of downlink MIMO layers less than a second quantity of downlink MIMO layers associated with the capability of the UE.

In some examples of the method, apparatuses, and non-transitory computer-readable medium described herein, the assistance information associated with the quantity of downlink MIMO layers requests a reduction from the second quantity of downlink MIMO layers to the first quantity of downlink MIMO layers.

Some examples of the method, apparatuses, and non-transitory computer-readable medium described herein may further include operations, features, means, or instructions for receiving, from an application of the UE via a modem control interface, an indication that the UE satisfies the second predetermined trigger threshold, where transmitting the assistance information associated with the quantity of downlink MIMO layers may be based on the indication from the application of the UE.

In some examples of the method, apparatuses, and non-transitory computer-readable medium described herein, the second predetermined trigger threshold includes at least a latency condition of an application of the UE being less than a threshold latency, or a downlink throughput to the UE being less than a threshold throughput, or any combination thereof.

Some examples of the method, apparatuses, and non-transitory computer-readable medium described herein may further include operations, features, means, or instructions for transmitting, to the base station, assistance information associated with a scheduling offset parameter based on the UE satisfying a second predetermined trigger threshold and receiving, from the base station, second control signaling indicating a re-configuration of the scheduling offset parameter based on the assistance information associated with the scheduling offset parameter.

In some examples of the method, apparatuses, and non-transitory computer-readable medium described herein, transmitting the assistance information associated with the scheduling offset parameter may include operations, features, means, or instructions for transmitting an indication of a first quantity of slots for the scheduling offset parameter greater than a second quantity of slots associated with the capability of the UE.

In some examples of the method, apparatuses, and non-transitory computer-readable medium described herein, the assistance information associated with the scheduling offset parameter requests an increase from the second quantity of slots to the first quantity of slots for the scheduling offset parameter.

Some examples of the method, apparatuses, and non-transitory computer-readable medium described herein may further include operations, features, means, or instructions for receiving, from an application of the UE via a modem control interface, an indication that the UE satisfies the second predetermined trigger threshold, where transmitting the assistance information associated with the scheduling offset parameter may be based on the indication from the application of the UE.

In some examples of the method, apparatuses, and non-transitory computer-readable medium described herein, the second predetermined trigger threshold includes at least a latency condition of an application of the UE being less than a threshold latency.

Some examples of the method, apparatuses, and non-transitory computer-readable medium described herein may further include operations, features, means, or instructions for transmitting, to the base station, assistance information associated with one or both of a quantity of component carriers or an aggregated bandwidth allocation for an SCG based on the UE satisfying a second predetermined trigger threshold and receiving, from the base station, second control signaling indicating a re-configuration of one or both of the quantity of component carriers or the aggregated bandwidth allocation for the SCG based on the assistance information associated with one or both of the quantity of component carriers or the aggregated bandwidth allocation for the SCG.

In some examples of the method, apparatuses, and non-transitory computer-readable medium described herein, transmitting the assistance information associated with the quantity of component carriers may include operations, features, means, or instructions for transmitting an indication of a first quantity of component carriers less than a second quantity of component carriers configured at the UE.

In some examples of the method, apparatuses, and non-transitory computer-readable medium described herein, the assistance information associated with the quantity of component carriers requests a reduction from the second quantity of component carriers to the first quantity of component carriers.

In some examples of the method, apparatuses, and non-transitory computer-readable medium described herein, transmitting the assistance information associated with the aggregated bandwidth allocation for the SCG may include operations, features, means, or instructions for transmitting an indication of a first aggregated bandwidth allocation for the SCG less than a second aggregated bandwidth allocation for the SCG configured at the UE.

In some examples of the method, apparatuses, and non-transitory computer-readable medium described herein, the assistance information associated with the aggregated bandwidth allocation for the SCG requests a reduction from the second aggregated bandwidth allocation for the SCG to the first aggregated bandwidth allocation for the SCG.

Some examples of the method, apparatuses, and non-transitory computer-readable medium described herein may further include operations, features, means, or instructions for receiving, from an application of the UE via a modem control interface, an indication to disable dual-connectivity (DC), where transmitting the assistance information associated with one or both of the quantity of component carriers or the aggregated bandwidth allocation for the SCG may be based on the indication to disable DC.

In some examples of the method, apparatuses, and non-transitory computer-readable medium described herein, receiving the re-configuration of one or both of the quantity of component carriers or the aggregated bandwidth allocation for the SCG may include operations, features, means, or instructions for receiving a command to release the SCG.

Some examples of the method, apparatuses, and non-transitory computer-readable medium described herein may further include operations, features, means, or instructions for starting a timer based on transmitting the assistance information associated with one or both of the quantity of component carriers or the aggregated bandwidth allocation for the SCG and initiating a radio link failure for the SCG based on receiving the second control signaling indicating the re-configuration of one or both of the quantity of component carriers or the aggregated bandwidth allocation for the SCG after expiration of the timer.

In some examples of the method, apparatuses, and non-transitory computer-readable medium described herein, the second predetermined trigger threshold includes at least an uplink throughput from the UE being less than a threshold uplink throughput, or a downlink throughput to the UE being less than a threshold downlink throughput, or an indication from an application of the UE that a display may be off being received, or any combination thereof.

Some examples of the method, apparatuses, and non-transitory computer-readable medium described herein may further include operations, features, means, or instructions for transmitting, to the base station, signaling indicating the capability of the UE for the reporting of the assistance information, where receiving the configuration for the reporting of the assistance information may be based on transmitting the signaling indicating the capability of the UE.

DETAILED DESCRIPTION

Figure 1:
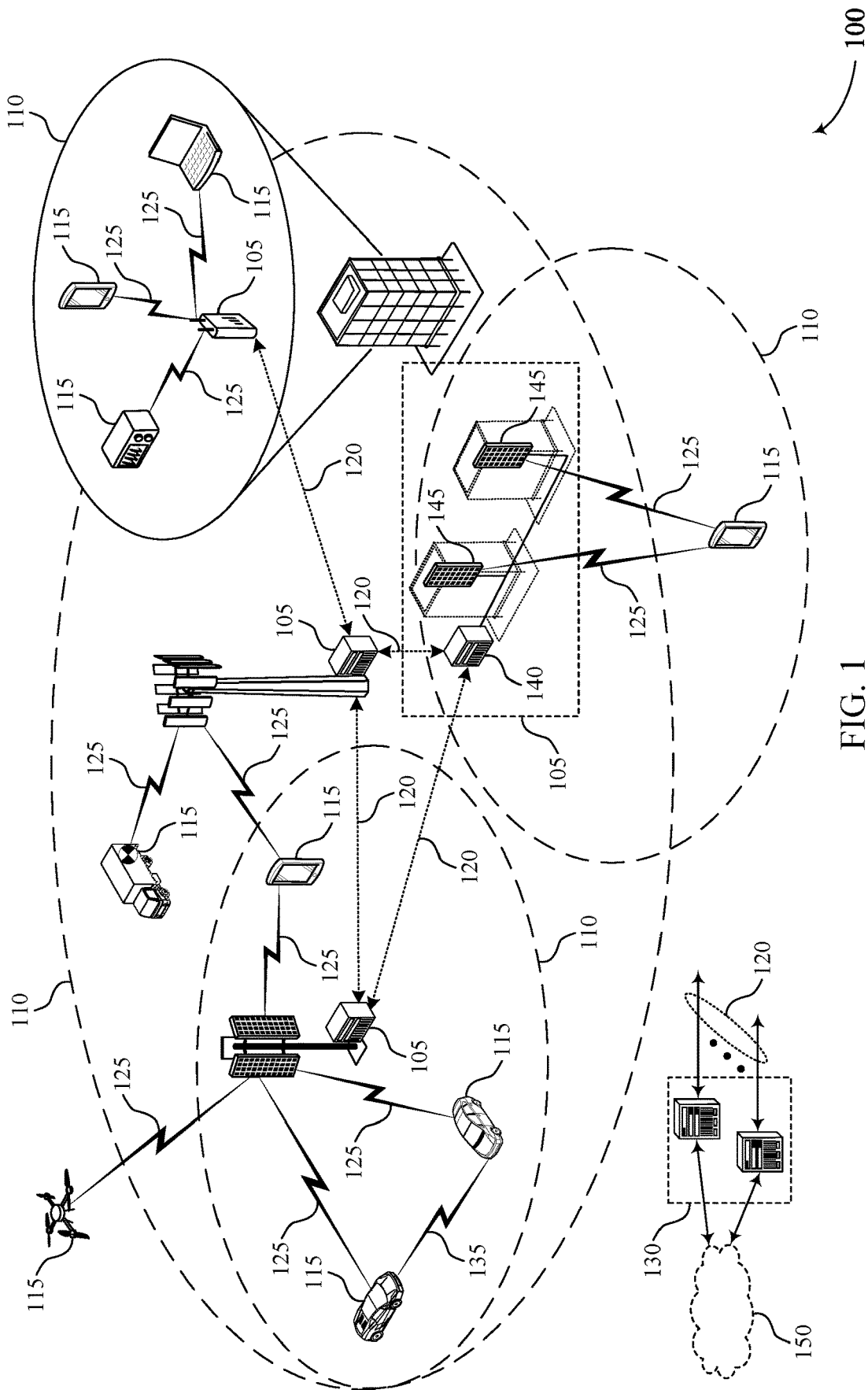
FIGS. 1 and 2 illustrate examples of wireless communications systems that support techniques for providing assistance information for one or more communication parameters in accordance with aspects of the present disclosure.

In some wireless communications systems, a user equipment (UE) may provide a base station with assistance information indicating a request or a preference of the UE for one or more communication parameters configured at the UE. For example, the UE may transmit assistance information to request an adjustment or a modification to one or more communication parameters configured at the UE based on a UE capability or based on the UE entering a power saving mode. In some cases, however, the UE may be unaware of how to provide assistance information for some communication parameters, which may hinder an ability of the UE to request an adjustment or modification to those communication parameters. Such communication parameters may include a quantity of uplink multiple-input multiple-output (MIMO) layers configured for uplink communication between the UE and the base station, a quantity of downlink MIMO layers configured for downlink communication between the UE and the base station, a scheduling offset configured to separate a downlink grant and transmissions scheduled by the downlink grant, a quantity of component carriers configured at the UE, or an aggregated bandwidth for a secondary cell group (SCG) configured at the UE.

In some implementations of the present disclosure, the UE may transmit, to the base station, assistance information that is associated with the quantity of uplink MIMO layers, the quantity of downlink MIMO layers, the scheduling offset, the quantity of component carriers, or the aggregated bandwidth for the SCG, or a combination thereof, based on the UE satisfying one or more triggering conditions or thresholds. For example, the UE may transmit assistance information requesting a reduction in the quantity of uplink MIMO layers configured at the UE based on detecting or otherwise determining that a latency associated with an application of the UE is less than a threshold latency, that an uplink throughput from the UE is less than a threshold throughput, that an uplink block error rate (BLER) is greater than a threshold BLER, or that an amount of data in a buffer is less than a threshold amount of data, or a combination thereof. Additionally or alternatively, the UE may transmit assistance information requesting a reduction in the quantity of downlink MIMO layers configured at the UE based on detecting or otherwise determining that the latency associated with the application of the UE is less than the threshold latency or that a downlink throughput to the UE is less than a threshold throughput, or both.

Additionally or alternatively, the UE may transmit assistance information requesting an increase of the scheduling offset configured at the UE based on detecting or otherwise determining that the latency condition of the application of the UE is less than the threshold latency. Additionally or alternatively, the UE may transmit assistance information requesting a reduction in the quantity of component carriers configured at the UE or a reduction in the aggregated bandwidth for the SCG configured at the UE, or both, based on detecting or otherwise determining that a throughput (an uplink or a downlink throughput, or both) is less than a threshold throughput, based on receiving signaling from the application of the UE indicating that a display is in an "OFF" state, or based on receiving a command to disable dual-connectivity (DC) from a modem of the UE, or a combination thereof.

As such, the UE may transmit assistance information requesting an adjustment to the configured quantity of uplink MIMO layers, the configured quantity of downlink MIMO layers, the scheduling offset, the quantity of component carries, or the aggregated bandwidth for the SCG in scenarios in which such an adjustment may increase the likelihood for successful communications between the UE and the base station and in scenarios in which such an adjustment (which may include re-configuration signaling from the base station in response to the requested adjustment) avoids adversely affecting a quality of service (QoS) of the application of the UE. Further, the described techniques may be implemented to reduce power consumption at the UE while increasing the likelihood for successful communications and maintaining QoS. For example, a reduction in the quantity of uplink or downlink MIMO layers, the quantity of component carriers, or the aggregated bandwidth for the SCG (e.g., an exit from a DC deployment) or an increase in the minimum scheduling offset values configured at the UE may reduce an amount of resources that the UE may consume for transmissions to the base station or for monitoring for transmissions from the base station, which may reduce processing complexity and increase power savings at the UE. Accordingly, the UE may experience a longer battery life, higher data rates, increased throughput, and greater spectral efficiency, among other benefits.

Aspects of the disclosure are initially described in the context of wireless communications systems. Additionally, aspects of the disclosure are illustrated and described with reference to triggering decisions and process flows. Aspects of the disclosure are further illustrated by and described with reference to apparatus diagrams, system diagrams, and flowcharts that relate to techniques for providing assistance information for one or more communication parameters.

FIG. 1 illustrates an example of a wireless communications system 100 that supports techniques for providing assistance information for one or more communication parameters in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support configurations for and reporting of assistance information from a UE 115 to a base station 105. In some cases, for example, the base station 105 may transmit, to the UE 115, a configuration for reporting assistance information. The configuration for reporting assistance information may include a configuration of one or more communication parameters for which the UE 115 may transmit assistance information or a configuration of the UE 115 to transmit assistance information associated with one or more communication parameters based on one or more triggering conditions or thresholds, or both. In some cases, however, such a configuration may be lacking for some communication parameters, such that the UE 115 may be unaware of how or under which conditions the UE 115 may transmit assistance information for those communication parameters. In some aspects, such communication parameters may include, but are not limited to, a quantity of uplink MIMO layers configured at the UE 115 for transmissions from the UE 115 to the base station 105, a quantity of downlink MIMO layers configured at the UE 115 for transmissions from the base station 105 to the UE 115, a minimum scheduling offset value (which may be referred to herein as a minimum K0) configured at the UE 115 defining a minimum gap or separation (in the time domain) between a downlink grant and a downlink transmission (e.g., a downlink bandwidth transmission) scheduled by the downlink grant, a quantity of component carriers configured for communication between the UE 115 and the base station 105, or an aggregated bandwidth for an SCG.

In some implementations of the present disclosure, the configuration for reporting assistance information may include a configuration for reporting assistance information for such communication parameters or the UE 115 may be otherwise configured to report assistance information for such communication parameters based on satisfying one or more triggering conditions or thresholds at the UE 115. Accordingly, if the UE 115 detects or otherwise determines that one or more of the triggering conditions or thresholds are met or are otherwise satisfied, the UE 115 may transmit assistance information associated with any one or more of such communication parameters. The base station 105, based on receiving the assistance information, may transmit control signaling, such as downlink control information (DCI) or radio resource control (RRC) signaling, to the UE 115 re-configuring the communication parameters for which assistance information was requested (or otherwise addressing the assistance information provided by the UE 115).

Figure 2:
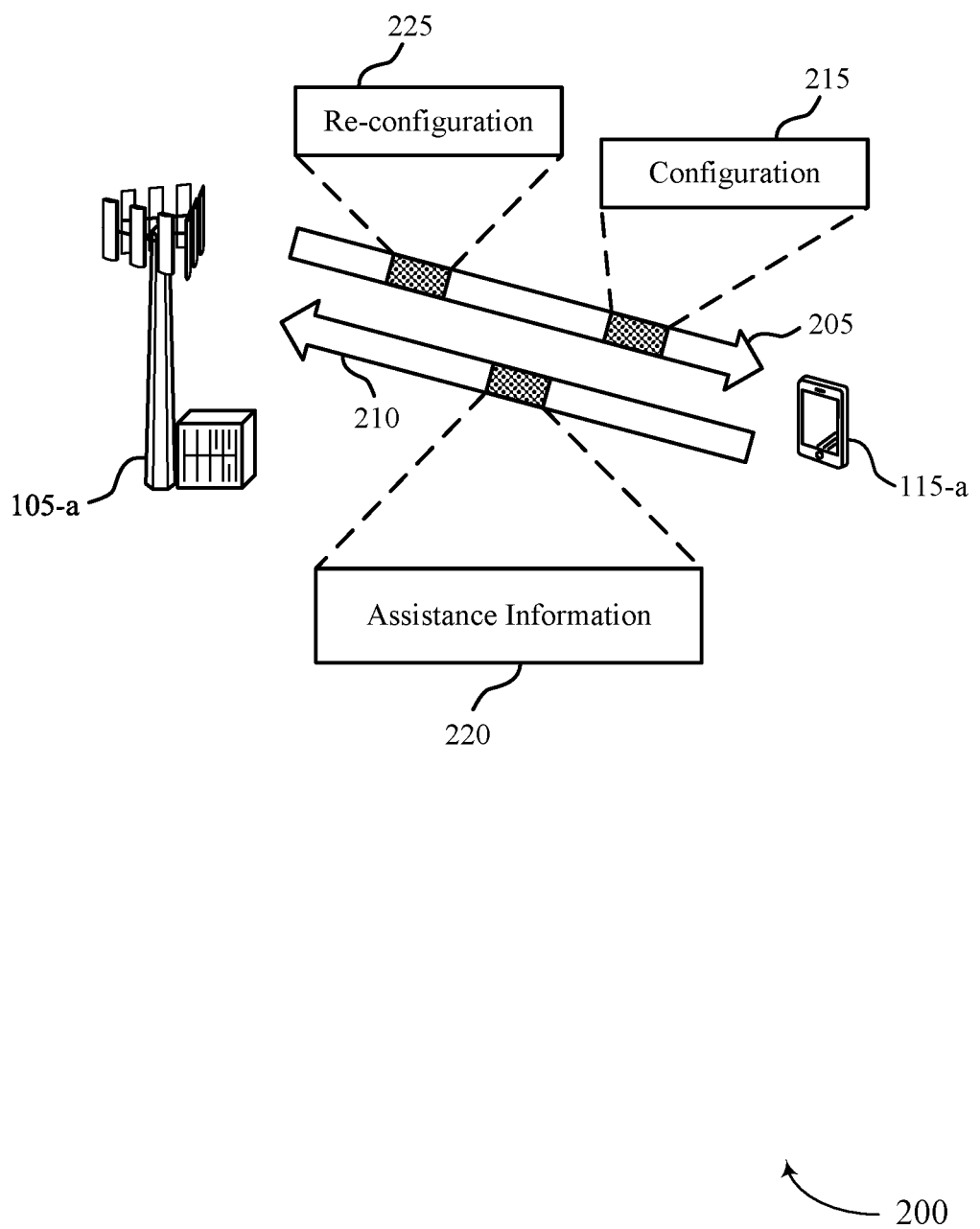

FIG. 2 illustrates an example of a wireless communications system 200 that supports techniques for providing assistance information for one or more communication parameters in accordance with aspects of the present disclosure. The wireless communications system 200 may implement or be implemented to realize aspects of the wireless communications system 100. For example, the wireless communications system 200 may include a UE 115-a and a base station 105-a, which may be examples of corresponding devices as described with reference to FIG. 1. The UE 115-a and the base station 105-a may communicate via an uplink communication link 205 and a downlink communication link 210. In some examples, the UE 115-a may transmit assistance information 220 to the base station 105-a associated with one or more of a quantity of uplink MIMO layers, a quantity of downlink MIMO layers, a minimum scheduling offset, a quantity of component carriers, or an aggregated bandwidth for an SCG configured at the UE 115-a based on satisfying one or more triggering conditions or thresholds at the UE 115-a.

For example, the base station 105-a may transmit a configuration 215 to the UE 115-a configuring assistance information of the quantity of uplink MIMO layers at the UE 115-a such that the UE 115-a may transmit to the base station 105-a over the configured quantity of uplink MIMO layers or configuring assistance information of the quantity of downlink MIMO layers at the UE 115-a such that the UE 115-a may receive from the base station 105-a over the configured quantity of downlink MIMO layers, or both. Additionally or alternatively, the base station 105-a may transmit the configuration 215 to the UE 115-a configuring assistance information of the minimum scheduling offset that defines a gap (in time, such as a minimum gap in time) between a downlink grant and a downlink transmission scheduled by the downlink grant, configuring assistance information of the quantity of component carriers over which the UE 115-a and the base station 105-a may communicate, or configuring assistance information of the aggregated bandwidth for the SCG such that the UE 115-a may communicate with the base station 105-a via the SCG over the aggregated bandwidth, or a combination thereof. In some aspects, the base station 105-a may transmit the configuration 215 via RRC signaling and the configuration 215 may include a field or an information element (e.g., an RRCReconfiguration information element) indicating which communication parameter (e.g., which of the quantity of uplink MIMO layers, the quantity of downlink MIMO layers, the minimum scheduling offset, the quantity of component carriers, or the aggregated bandwidth for the SCG) is configured for the assistance information via the configuration 215.

For instance, in examples in which the base station 105-a transmits the configuration 215 configuring assistance information of a maximum quantity of uplink MIMO layers at the UE 115-a, the configuration 215 may include an RRCReconfiguration(otherConfig(maxMIMO-LayerPreferenceConfig)) information element. Additionally or alternatively, in examples in which the base station 105-a transmits the configuration 215 configuring assistance information of a maximum quantity of downlink MIMO layers at the UE 115-a, the configuration 215 may also include an RRCReconfiguration(otherConfig(maxMIMO-LayerPreferenceConfig)) information element. Additionally or alternatively, in examples in which the base station 105-*a* transmits the configuration 215 configuring assistance information of the minimum scheduling offset at the UE 115-*a*, the configuration 215 may include an RRCReconfiguration(otherConfig(minSchedulingOffset-PreferenceConfig)) information element. Additionally or alternatively, in examples in which the base station 105-*a* transmits the configuration 215 configuring assistance information of a maximum quantity of component carriers or assistance information of a maximum aggregated (or total) bandwidth for the SCG (and for a master cell group (MCG), in some cases), the configuration 215 may include an RRCConnectionReconfiguration (RRCReconfiguration(otherConfig(maxBW-PreferenceConfig, maxCC-PreferenceConfig))) information element.

In some examples, the base station 105-*a* may generate or otherwise determine the configuration 215 based on a capability of the UE 115-*a*. For example, the UE 115-*a* may transmit capability information (e.g., via a UECapabilnyInformation information element) indicating a maximum, upper limit, minimum, lower limit, or constraint of the UE 115-*a* for one or more communication parameters and the base station 105-*a* may generate the configuration 215 based on the capability information received from the UE 115-*a*. In some aspects, the UE 115-*a* may transmit the capability information via an information element based on which communication parameter the capability information is associated with. For instance, in examples in which the UE 115-*a* transmits capability information for a maximum or upper limit of the quantity of uplink or downlink MIMO layers that may be configured at the UE 115-*a*, the UE 115-*a* may transmit the capability information via a UECapabilnyInformation(maxMIMO-LayerPreference) information element. Additionally or alternatively, in examples in which the UE 115-*a* transmits capability information for a minimum or a lower limit of a scheduling offset value that may be configured at the UE 115-*a*, the UE 115-*a* may transmit the capability information via a UECapabilnyInformation(minSchedulingOffset-Preference) information element. Additionally or alternatively, in examples in which the UE 115-*a* transmits capability information for a maximum or upper limit of the quantity of component carriers or a maximum or upper limit for the aggregated bandwidth that may be configured at the UE 115-*a*, the UE 115-*a* may transmit the capability information via a UECapabilnyInformation (maxBW-Preference, maxCC-Preference) information element.

The capability information of the UE 115-*a* may indicate, to the base station 105-*a*, an initial preference or value associated with the corresponding communication parameter. For instance, in examples in which the wireless communications system 200 supports the reporting of assistance information 220 for uplink MIMO layers, the capability information may request an initial value for maxMIMO-LayerPreference (which may define a maximum quantity of uplink MIMO layers that the base station 105-*a* may configure for communication with the UE 115-*a*). Similarly, in examples in which the wireless communications system 200 supports the reporting of assistance information 220 for downlink MIMO layers, the capability information may request an initial value for maxMIMO-LayerPreference (which also may define a maximum quantity of downlink MIMO layers that the base station 105-*a* may configure for communication with the UE 115-*a*). Further, in examples in which the wireless communications system 200 supports the reporting of assistance information 220 for a minimum scheduling offset, the capability information may request an initial value for minSchedulingOffsetPreference (which may define a minimum scheduling offset value that the base station 105-*a* may configure for communication with the UE 115-*a*). Additionally or alternatively, in examples in which the wireless communications system 200 supports the reporting of assistance information 220 for a maximum quantity of component carriers or a maximum aggregated bandwidth for the MCG or SCG, the capability information may request an initial value for maxBW-Preference and for maxCC-Preference.

As such, the base station 105-*a* may transmit the configuration 215 configuring assistance information for the maximum quantity of uplink MIMO layers, assistance information for the maximum quantity of downlink MIMO layers, assistance information for the minimum scheduling offset, assistance information for the maximum quantity of component carriers, or assistance information for the maximum aggregated bandwidth for the MCG or the SCG (or a combination thereof) according to or based on the values indicated by the UE 115-*a* via the capability information. Additionally, in some examples, the base station 105-*a* may transmit the configuration 215 to the UE 115-*a* to set up or otherwise configure the UE 115-*a* for sending assistance information 220 to request an adjustment or modification (such as an increase or a decrease) of the configured maximum quantities of uplink or downlink MIMO layers, the configured minimum scheduling offset, the configured maximum quantity of component carriers, or the configured maximum aggregated bandwidth for the MCG or the SCG. In some aspects, the configuration 215 may configure the UE 115-*a* to transmit such assistance information 220 per cell group (such as per MCG or per SCG, per component carrier, or per radio frequency band). In such aspects, the configuration 215 may configure the UE 115-*a* to transmit assistance information 220 requesting an update to the configured one or more communication parameters per cell group.

In some implementations of the present disclosure, the UE 115-*a* may determine whether or not to transmit assistance information 220 based on whether or not the UE 115-*a* satisfies one or more conditions or thresholds. For example, the UE 115-*a* may be configured (such as pre-configured) with one or more conditions or thresholds and may transmit assistance information 220 associated with one or more of the configured maximum quantity of uplink MIMO layers, the configured maximum quantity of downlink MIMO layers, the configured minimum scheduling offset, the configured maximum quantity of component carriers, or the configured maximum aggregated bandwidth for the MCG or the SCG based on detecting or otherwise determining that the UE 115-*a* satisfies the pre-configured (or predetermined) conditions or thresholds. In some aspects, such conditions or thresholds may vary based on which communication parameter the assistance information 220 is associated with.

For example, the UE 115-*a* may transmit assistance information 220 associated with the configured maximum quantity of uplink MIMO layers based on detecting that the UE 115-*a* satisfies a first threshold (e.g., a first predetermined threshold triggering transmission of the assistance information 220). Additionally or alternatively, the UE 115-*a* may transmit assistance information 220 associated with the configured maximum quantity of downlink MIMO layers based on detecting that the UE 115-*a* satisfies a second threshold (e.g., a second predetermined threshold triggering transmission of the assistance information 220). Additionally or alternatively, the UE 115-*a* may transmit assistance information 220 associated with the configured minimum scheduling offset based on detecting that the UE 115-*a* satisfies a third threshold (e.g., a third predetermined threshold triggering transmission of the assistance information 220). Additionally or alternatively, the UE 115-*a* may transmit assistance information 220 associated with the configured maximum quantity of component carriers or the configured maximum aggregated bandwidth for the MCG or the SCG based on detecting that the UE 115-*a* satisfies a fourth threshold (e.g., a fourth predetermined threshold triggering transmission of the assistance information 220). In some aspects, the first threshold, the second threshold, the third threshold, and the fourth threshold may be different thresholds or may be a same threshold and, in some examples, the first threshold, the second threshold, the third threshold, or the fourth threshold may include multiple thresholds (such that a threshold may be satisfied if each, if not all, of multiple sub-thresholds are satisfied). Additional details relating to such thresholds that may trigger the transmission of assistance information 220 are described herein, including with reference to FIGS. 3 through 6.

The UE 115-*a* may transmit the assistance information 220 including or defining various information elements based on which communication parameter (or communication parameters) the assistance information 220 is associated with. For instance, in examples in which the UE 115-*a* transmits assistance information 220 requesting a change to the maximum quantity of uplink or downlink MIMO layers that may be configured at the UE 115-*a*, the UE 115-*a* may include or define a UEAssistanceInformation(maxMIMO-LayerPreference) information element including or otherwise indicating the requested change to the maximum quantity of uplink or downlink MIMO layers that may be configured at the UE 115-*a*. Additionally or alternatively, in examples in which the UE 115-*a* transmits assistance information 220 requesting a change to the minimum scheduling offset that may be configured at the UE 115-*a*, the UE 115-*a* may include or define a UEAssistanceInformation(minSchedulingOffset-Preference) information element including or otherwise indicating the requested change to the minimum scheduling offset that may be configured at the UE 115-*a*. Additionally or alternatively, in examples in which the UE 115-*a* transmits assistance information 220 requesting a change to the maximum quantity of component carriers or the maximum aggregated bandwidth for the MCG or the SCG, the UE 115-*a* may include or define a UEAssistanceInformation(maxBW-Preference, maxCC-Preference) information element (which may be encapsulated as an UEInformationTransferMRDC(UEAssistanceInformation(maxBW-Preference, maxCC-Preference)) information element in examples in which the UE 115-*a* operates in a multi-radio access technology (RAT)-DC (MRDC) deployment).

The base station 105-*a*, based on receiving the assistance information 220 from the UE 115-*a*, may determine to re-configure one or more communication parameters associated with the requested update in the assistance information 220, to re-configure a resource allocation to satisfy the requested update in the assistance information 220, or otherwise re-configure some aspect of communications between the UE 115-*a* and the base station 105-*a* (such as releasing component carriers or the SCG) to address the assistance information 220 provided by the UE 115-*a*. The base station 105-*a* may transmit control signaling indicating such a re-configuration 225 to the UE 115-*a*. The control signaling may include or otherwise refer to DCI or RRC signaling, or both.

For instance, in examples in which the UE 115-*a* transmits assistance information 220 requesting an update to the configured maximum quantity of uplink MIMO layers (e.g., requesting an update of maxMIMO-LayerPreference), the base station 105-*a* may transmit the re-configuration 225 via DCI to indicate a switch from a first bandwidth part (BWP) to a another active BWP that meets or otherwise satisfies the requested update to the maximum quantity of uplink MIMO layers. In other words, for example, the UE 115-*a* may switch from the first BWP to a second BWP based on the re-configuration 225 and the second BWP may be associated with a maximum quantity of uplink MIMO layers that is equal or approximately equal to the request indicated by the assistance information 220. Additionally or alternatively, the base station 105-*a* may transmit the re-configuration 225 via RRC signaling (such as via an RRCReconfiguration information element) indicating a re-configured value for the maximum quantity of uplink MIMO layers that may be configured at the UE 115-*a* for communications from the UE 115-*a* to the base station 105-*a*. In some aspects, the re-configured maximum quantity of uplink MIMO layers may be associated with communication over an uplink channel, such as a physical uplink shared channel (PUSCH).

Additionally or alternatively, in examples in which the UE 115-*a* transmits assistance information 220 requesting an update to the configured maximum quantity of downlink MIMO layers (e.g., requesting an update of maxMIMO-LayerPreference), the base station 105-*a* may transmit the re-configuration 225 via DCI to indicate a switch from a first BWP to a another active BWP that meets or otherwise satisfies the requested update to the maximum quantity of downlink MIMO layers. In other words, for example, the UE 115-*a* may switch from the first BWP to a second BWP based on the re-configuration 225 and the second BWP may be associated with a maximum quantity of downlink MIMO layers that is equal or approximately equal to the request indicated by the assistance information 220. Additionally or alternatively, the base station 105-*a* may transmit the re-configuration 225 via RRC signaling (such as via the RRCReconfiguration information element) indicating a re-configured value for the maximum quantity of downlink MIMO layers that may be configured at the UE 115-*a* for communications from the base station 105-*a* to the UE 115-*a*. In some aspects, the re-configured maximum quantity of downlink MIMO layers may be associated with communication over a downlink channel, such as a physical downlink shared channel (PDSCH).

Additionally or alternatively, in examples in which the UE 115-*a* transmits assistance information 220 requesting an update to the configured minimum scheduling offset (e.g., requesting an update of minSchedulingOffsetPreference), the base station 105-*a* may transmit the re-configuration 225 via DCI to indicate a switch from a first BWP to a another active BWP that meets or otherwise satisfies the requested update to the minimum scheduling offset. In other words, for example, the UE 115-*a* may switch from the first BWP to a second BWP based on the re-configuration 225 and the second BWP may be associated with a minimum scheduling offset that is equal or approximately equal to the request indicated by the assistance information 220. The base station 105-*a* may also, or alternatively, transmit the re-configuration 225 via the DCI to indicate a change of the configured minimum scheduling offset. For example, the re-configuration 225 may include a "minimum applicable scheduling offset indicator" of DCI format 0_1 or DCI format 1_1 that indicates the change between two RRC-configured minimum scheduling offset values (such as between two RRC-configured minimumSchedulingOffsetK0/K2 values as configured by RRC RRCReconfiguration). Additionally or alternatively, the base station 105-*a* may transmit the re-configuration 225 via RRC signaling (such as via the RRCReconfiguration information element) indicating a re-configured value for the minimum scheduling offset that may be configured at the UE 115-*a*.

Additionally or alternatively, in examples in which the UE 115-*a* transmits assistance information 220 requesting an update to the configured maximum quantity of component carriers or the configured maximum aggregated bandwidth for the MCG or the SCG (e.g., requesting an update of maxBW-Preference or maxCC-Preference), the base station 105-*a* may transmit the re-configuration 225 via RRC signaling (such as via the RRCReconfiguration information element) to release one or more component carriers or to release some bandwidth allocated for the SCG. In some implementations, such as in implementations in which the UE 115-*a* requests a reduction of the quantity of component carriers to zero or a reduction of the aggregated bandwidth for the SCG to zero, the base station 105-*a* may transmit the re-configuration 225 to release all component carriers or to release the SCG (such that the UE 115-*a* may refrain from monitoring for communication over all released component carriers or over the SCG).

In some aspects, the UE 115-*a* may start a timer (which may be configured at the UE 115-*a* by the base station 105-*a* or the network via a PreferenceProhibitTimer information element) based on transmitting the assistance information 220. The timer may define a time period during which the UE 115-*a* may refrain from sending assistance information 220 for a same purpose. For example, if the UE 115-*a* transmits the assistance information 220 associated with the maximum quantity of uplink MIMO layers at a first occasion, the UE 115-*a* may refrain from sending assistance information 220 associated with the maximum quantity of uplink MIMO layers for the duration of the timer measured from the first occasion (which may be configured as Timer T346d for maxMIMO-LayerPreferenceProhibitTimer). Similarly, if the UE 115-*a* transmits the assistance information 220 associated with the maximum quantity of downlink MIMO layers at a first occasion, the UE 115-*a* may refrain from sending assistance information 220 associated with the maximum quantity of downlink MIMO layers for the duration of the timer measured from the first occasion (which may also be configured as Timer T346d for maxMIMO-LayerPreferenceProhibitTimer).

Additionally or alternatively, if the UE 115-*a* transmits the assistance information 220 associated with the minimum scheduling offset at a first occasion, the UE 115-*a* may refrain from sending assistance information 220 associated with the minimum scheduling offset for the duration of the timer measured from the first occasion (which may be configured as Timer 346e for minSchedulingOffsetPreferenceProhibitTimer). Additionally or alternatively, if the UE 115-*a* transmits the assistance information 220 associated with the maximum quantity of component carriers or the maximum aggregated bandwidth at a first occasion, the UE 115-*a* may refrain from sending assistance information 220 associated with the maximum quantity of component carriers or the maximum aggregated bandwidth for the duration of the timer measured from the first occasion (which may be configured as Timer T346b for maxBW-PreferenceProhibitTimer or as Timer T346c for maxCC-PreferenceProhibitTimer). Upon expiration of the timer, the UE 115-*a* may again transmit assistance information 220 for the same purpose as a previous instance of the assistance information 220 (if the UE 115-*a* satisfies the conditions or thresholds for transmitting such assistance information 220).

In some examples, the UE 115-*a* may determine to return or recover from the updated value of a communication parameter to the initial value of the communication parameter (e.g., the initial value being the value indicated by the capability information of the UE 115-*a* or the value configured via the configuration 215). In such examples (and after expiration of any prohibitive timer), the UE 115-*a* may transmit another instance of assistance information 220 with an information element corresponding to the communication parameter being left empty. For example, if the UE 115-*a* determines to recover or otherwise reset the value of the maximum quantity of uplink or downlink MIMO layers, the UE 115-*a* may transmit assistance information 220 including an empty UEAssistanceInformation(maxMIMO-LayerPreference) information element (i.e., there is no preferred value of the information element).

Additionally or alternatively, if the UE 115-*a* determines to recover or otherwise reset the value of the minimum scheduling offset, the UE 115-*a* may transmit assistance information 220 including an empty UEAssistanceInformation(minSchedulingOffset-Preference) information element. Additionally or alternatively, if the UE 115-*a* determines to recover or otherwise reset the value of the maximum quantity of component carriers or the maximum aggregated bandwidth for the MCG or the SCG, the UE 115-*a* may transmit assistance information 220 including an empty UEAssistanceInformation(maxBW-Preference, maxCC-Preference) information element. As such, the base station 105-*a* may receive the empty information element and re-configure the value of the communication parameter or re-configure a resource allocation to satisfy the requested reset via additional re-configuration 225 signaling.

Further, although described in the context of the wireless communications system 200, which may illustrate a standalone deployment between the UE 115-*a* and the base station 105-*a*, the described techniques are equally applicable to non-standalone deployments, such as DC or carrier aggregation (CA) deployments. Additional details relating to the extension of the described techniques for transmitting assistance information 220 associated with the configured maximum quantity of uplink MIMO layers, the configured maximum quantity of downlink MIMO layers, or the configured minimum scheduling offset to non-standalone deployments are illustrated and described herein, including by and with reference to FIG. 8. Further, additional details relating to the providing of assistance information for the maximum quantity of component carriers or the maximum aggregated bandwidth for the SCG are described in the context of various non-standalone deployments with reference to FIGS. 9 and 10.

Figure 3:
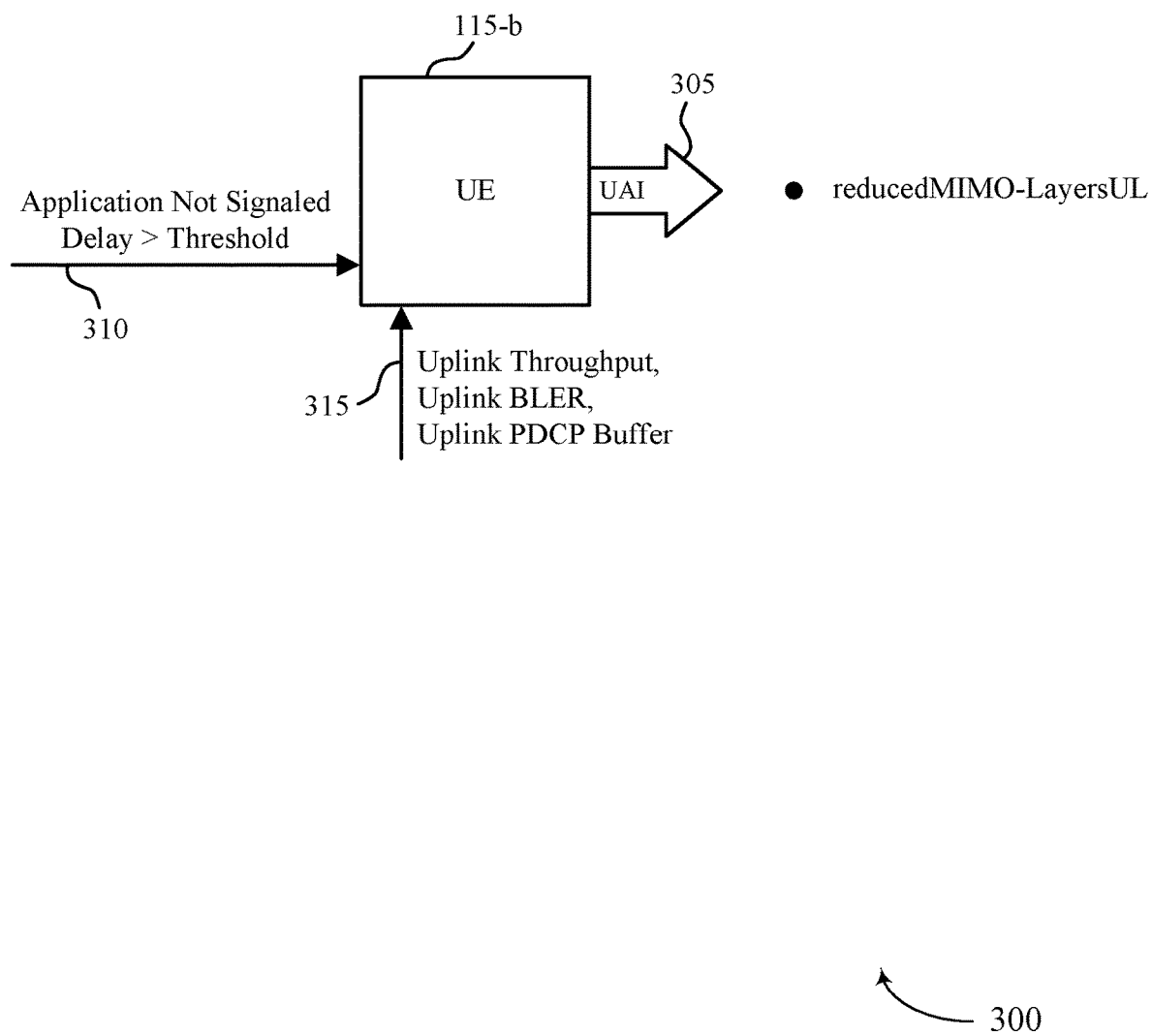
FIG. 3 illustrates an example of a triggering decision that supports techniques for providing assistance information for a reduced quantity of uplink multiple-input multiple-output (MIMO) layers in accordance with aspects of the present disclosure.

FIG. 3 illustrates an example of a triggering decision 300 that supports techniques for providing assistance information 305 for a reduced quantity of uplink MIMO layers in accordance with aspects of the present disclosure. For example, a UE 115-*b* (which may be an example of a corresponding device as described with reference to FIGS. 1 and 2) may employ the triggering decision 300 to determine whether or not to transmit assistance information 305 requesting a reduction of a maximum quantity of uplink MIMO layers configured at the UE 115-*b*. In other words, the triggering decision 300 may illustrate a triggering condition or threshold that prompts the UE 115-*b* to transmit assistance information 305 associated with the configured maximum quantity of uplink MIMO layers. In some aspects, the assistance information 305 transmitted by the UE 115-*b* may be referred to as UE assistance information (UAI).

As described with reference to FIG. 2, the UE 115-*b* may transmit the assistance information 305 including a UEAssistanceInformation(maxMIMO-LayerPreference)) information element. The UEAssistanceInformation(maxMIMO-LayerPreference)) information element may include a number of parameters, including a reducedMaxMIMO-LayersFR1 parameter (which may further include a reducedMIMO-LayersFR1-UL parameter) and a reducedMaxMIMO-LayersFR2 parameter (which may further include a reducedMIMO-LayersFR2-UL parameter). As such, to convey the requested update or modification to the configured maximum quantity of uplink MIMO layers, the UE 115-*b* may set the reducedMIMO-LayersFR1-UL parameter or the reducedMIMO-LayersFR2-UL parameter to requested values. In some cases, the UE 115-*b* may set the reducedMIMO-LayersFR1-UL parameter to an integer of 1, 2, 3, or 4 to indicate a request for a maximum quantity of uplink MIMO layers to be configured as 1, 2, 3, or 4, respectively. Similarly, the UE 115-*b* may set the reducedMIMO-LayersFR2-UL parameter to an integer of 1, 2, 3, or 4 to indicate a request for a maximum quantity of uplink MIMO layers to be configured as 1, 2, 3, or 4, respectively.

In some aspects, the triggering the condition or threshold associated with the triggering decision 300 may be equivalently referred to as a predetermined trigger threshold and the predetermined trigger threshold may be based on one or more conditions at the UE 115-*b*. For example, the predetermined trigger threshold may be based on whether or not an application of the UE 115-*b* has signaled a high latency issue (and whether an uplink PDCP buffer has more or less than a threshold quantity of packets), an uplink throughput from the UE 115-*b* to a base station 105, or a BLER of communication between the UE 115-*b* and the base station 105, or a combination thereof. In some examples, the UE 115-*b* may detect whether the predetermined trigger threshold is satisfied based on considering or accounting for the latency condition of the application of the UE 115-*b* via an input 310 and based on considering or accounting for the uplink throughput, the uplink BLER, or the uplink PDCP buffer size, or a combination thereof, via an input 315. Such an input 310 and an input 315 may function as inputs into one or more processing operations that the UE 115-*b* may perform to detect whether or not the predetermined trigger threshold is satisfied at the UE 115-*b*.

For instance, if the UE 115-*b* detects that the application (or an operating system) of the UE 115-*b* has not signaled a high latency issue (such that a latency condition of the application is less than a threshold latency), detects that the uplink throughput is less than a threshold uplink throughput (of an associated cell group), and detects that an amount of data in the uplink PDCP buffer is less than a threshold amount of data, and if the UE capability on at least one component carrier is configured with two or more uplink MIMO layers, the UE 115-*b* may transmit assistance information 305 to the base station 105 requesting or otherwise indicating a reduction of the two or more uplink MIMO layers to one.

In some implementations, the UE 115-*b* may further qualify whether or not to transmit the assistance information 305 based on whether or not a response is seen to a previous transmission of assistance information 305 and if the network supports the assistance information parameter. In implementations in which no response from the base station 105 to the previous transmission of assistance information 305 is not seen (such that the base station 105 provided a response to the previous transmission of assistance information 305) and if the network supports assistance information 305 for the maximum quantity of uplink MIMO layers, the UE 115-*b* may transmit the assistance information 305. In some aspects, the UE 115-*b* may transmit the assistance information 305 per cell group or per radio frequency range such that, if the UE 115-*b* is configured for communication over an FR1 radio frequency band, the UE 115-*b* may set reducedMIMO-Layers-FR1-UL=1 or, if the UE 115-*b* is configured for communication over an FR2 radio frequency band, the UE 115-*b* may set reducedMIMO-Layers-FR2-UL=1.

In another example, if the UE 115-*b* detects that an application (or an operating system) of the UE 115-*b* has not signaled a high latency issue (such that a latency condition of the application is less than a threshold latency), detects that an uplink BLER is greater than or above a threshold uplink BLER (of an associated cell group), and detects that an amount of data in the uplink PDCP buffer is less than a threshold amount of data (and if the UE capability on at least one component carrier is configured with two or more uplink MIMO layers), the UE 115-*b* may transmit assistance information 305 to the base station 105 requesting or otherwise indicating a reduction of the two or more uplink MIMO layers to one.

Accordingly, if no response from the base station 105 to a previous transmission of assistance information 305 is not seen (such that the base station 105 provided a response to the previous transmission of assistance information 305) and if the network supports assistance information 305 for the maximum quantity of uplink MIMO layers, the UE 115-*b* may transmit the assistance information 305. In some aspects, the UE 115-*b* may transmit the assistance information 305 per cell group or per radio frequency range such that, if the UE 115-*b* is configured for communication over an FR1 radio frequency band, the UE 115-*b* may transmit a reducedMIMO-Layers-FR1-UL=1 parameter or, if the UE 115-*b* is configured for communication over an FR2 radio frequency band, the UE 115-*b* may transmit a reducedMIMO-Layers-FR2-UL=1 parameter.

In examples in which the UE 115-*b* detects that the predetermined trigger threshold is not satisfied (or is no longer satisfied), the UE 115-*b* may refrain from requesting a reduction in the maximum quantity of uplink MIMO layers that may be configured at the UE 115-*b*. In such examples, the UE 115-*b* may instead transmit assistance information 305 including empty reducedMIMO-Layers-FR1-UL or reducedMIMO-Layers-FR2-UL parameters. As such, in some cases, the base station 105 may transmit control signaling to the UE 115-*b* recovering the UE 115-*b* from a reduced maximum quantity of uplink MIMO layers.

In addition or as an alternative to determining whether the predetermined trigger threshold is satisfied, the UE 115-*b* may transmit assistance information 305 to the base station 105 based on receiving a command from the application or an operating system of the UE 115-*b*. For example, the application or the operating system of the UE 115-*b* may send a command to a modem of the UE 115-*b* via a modem control interface and the UE 115-*b* may transmit the assistance information 305 to the base station 105 based on receiving the command. In some examples, the command from the application or the operating system may provide (e.g., dynamically provide via the modem control interface) values for the reducedMIMO-Layers-UL parameters. In such examples, the application or the operating system may measure or perform decisions relating to the uplink throughput or uplink BLER, or both, of the communication between the UE 115-b and the base station 105.

Figure 4:
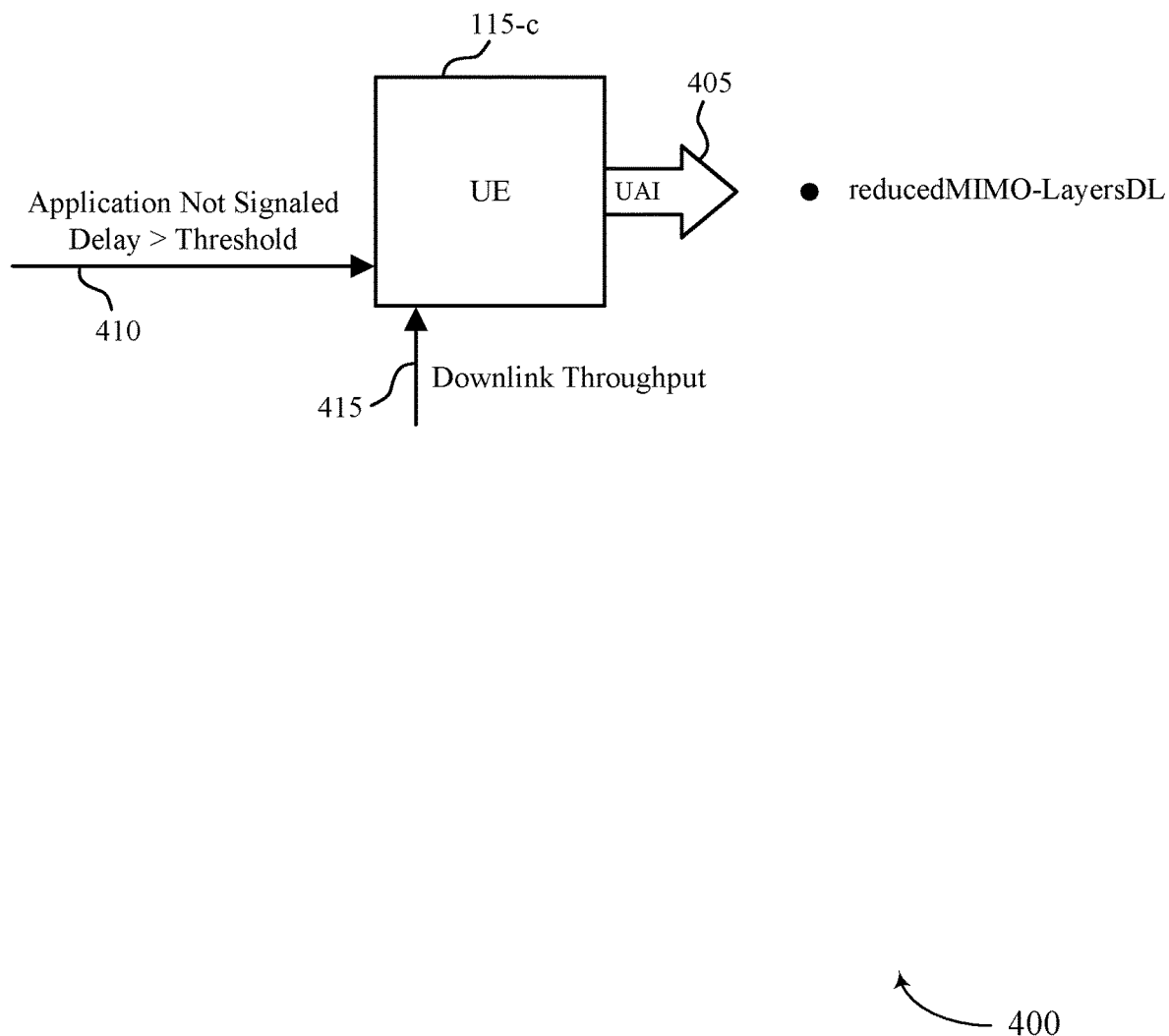
FIG. 4 illustrates an example of a triggering decision that supports techniques for providing assistance information for a reduced quantity of downlink MIMO layers in accordance with aspects of the present disclosure.

FIG. 4 illustrates an example of a triggering decision 400 that supports techniques for providing assistance information 405 for a reduced quantity of downlink MIMO layers in accordance with aspects of the present disclosure. For example, a UE 115-c (which may be an example of a corresponding device as described with reference to FIGS. 1 and 2) may employ the triggering decision 400 to determine whether or not to transmit assistance information 405 requesting a reduction of a maximum quantity of downlink MIMO layers configured at the UE 115-c. In other words, the triggering decision 400 may illustrate a triggering condition or threshold that prompts the UE 115-c to transmit assistance information 405 associated with the configured maximum quantity of downlink MIMO layers. In some aspects, the assistance information 405 transmitted by the UE 115-c may be referred to as UAI.

As described with reference to FIG. 2, the UE 115-c may transmit the assistance information 405 including a UEAssistanceInformation(maxMIMO-LayerPreference)) information element. The UEAssistanceInformation(maxMIMO-LayerPreference)) information element may include a number of parameters, including a reducedMaxMIMO-LayersFR1 parameter (which may further include a reduced-MIMO-LayersFR1-DL parameter) and a reduced-MaxMIMO-LayersFR2 parameter (which may further include a reducedMIMO-LayersFR2-DL parameter). As such, to convey the requested update or modification to the configured maximum quantity of downlink MIMO layers, the UE 115-c may set the reducedMIMO-LayersFR1-DL parameter or the reducedMIMO-LayersFR2-DL parameter to requested values. In some cases, the UE 115-c may set the reducedMIMO-LayersFR1-DL parameter to 1, 2, 3, 4, 5, 6, 7, or 8 to indicate a request for a maximum quantity of downlink MIMO layers to be configured as 1, 2, 3, 4, 5, 6, 7, or 8, respectively. Similarly, the UE 115-c may set the reducedMIMO-LayersFR2-DL parameter to 1, 2, 3, 4, 5, 6, 7, or 8 to indicate a request for a maximum quantity of downlink MIMO layers to be configured as 1, 2, 3, 4, 5, 6, 7, or 8, respectively.

In some aspects, the triggering the condition or threshold associated with the triggering decision 400 may be equivalently referred to as a predetermined trigger threshold and the predetermined trigger threshold may be based on one or more conditions at the UE 115-c. For example, the predetermined trigger threshold may be based on whether or not an application of the UE 115-c has signaled a high latency issue (and whether an uplink PDCP buffer has more or less than a threshold quantity of packets) or a downlink throughput from the UE 115-c to a base station 105, or both. Additionally, in some examples, the predetermined trigger threshold may be based on a size of an active BWP or a receiver diversity of the UE 115-c. In some examples, the UE 115-c may detect whether the predetermined trigger threshold is satisfied based on considering or accounting for the latency condition of the application of the UE 115-c via an input 410 and based on considering or accounting for the downlink throughput via an input 415. Such an input 410 and an input 415 may function as inputs into one or more processing operations that the UE 115-c may perform to detect whether or not the predetermined trigger threshold is satisfied at the UE 115-c.

For instance, if the UE 115-c detects that the application (or an operating system) of the UE 115-c has not signaled a high latency issue (such that a latency condition of the application is less than a threshold latency), detects that the downlink throughput is less than a threshold downlink throughput (of an associated cell group), detects that the active BWP of the UE 115-c has four receivers (4Rx) of the associated cell group, detects that an advanced receiver diversity of the UE 115-c has used 4Rx>X % of each component carrier in a last measurement period of the associated cell group (where X % refers to a threshold percentage use of the 4Rx in the last measurement period of the associated cell group), and if the UE capability on at least one component carrier is configured with two or more downlink MIMO layers, the UE 115-c may transmit assistance information 405 to the base station 105 requesting or otherwise indicating a reduction of the two or more downlink MIMO layers to one.

In some implementations, the UE 115-c may further qualify whether or not to transmit the assistance information 405 based on whether or not a response is seen to a previous transmission of assistance information 405 and if the network supports the assistance information parameter. In implementations in which no response from the base station 105 to the previous transmission of assistance information 405 is not seen (such that the base station 105 provided a response to the previous transmission of assistance information 405) and if the network supports assistance information 405 for the maximum quantity of downlink MIMO layers, the UE 115-c may transmit the assistance information 405. In some aspects, the UE 115-c may transmit the assistance information 405 per cell group or per radio frequency range such that, if the UE 115-c is configured for communication over an FR1 radio frequency band, the UE 115-c may set reducedMIMO-Layers-FR1-DL=2 or, if the UE 115-c is configured for communication over an FR2 radio frequency band, the UE 115-c may set reducedMIMO-Layers-FR2-DL=2.

In examples in which the UE 115-c detects that the predetermined trigger threshold is not satisfied, the UE 115-c may refrain from requesting a reduction in the maximum quantity of downlink MIMO layers that may be configured at the UE 115-c. In such examples, the UE 115-c may instead transmit assistance information 405 including empty reducedMIMO-Layers-FR1-DL or reducedMIMO-Layers-FR2-DL parameters. As such, in some cases, the base station 105 may transmit control signaling recovering the UE from a reduced maximum quantity of downlink MIMO layers.

In addition or as an alternative to determining whether the predetermined trigger threshold is satisfied, the UE 115-c may transmit assistance information 405 to the base station 105 based on receiving a command from the application or an operating system of the UE 115-c. For example, the application or the operating system of the UE 115-c may send a command to a modem of the UE 115-c via a modem control interface and the UE 115-c may transmit the assistance information 405 based on receiving the command. In some examples, the command from the application or the operating system may provide (e.g., dynamically provide via the modem control interface) values for the reducedMIMO-Layers-DL parameters. In such examples, the application or the operating system may measure or perform decisions relating to the downlink throughput of the communication between the UE 115-c and the base station 105.

Figure 5:
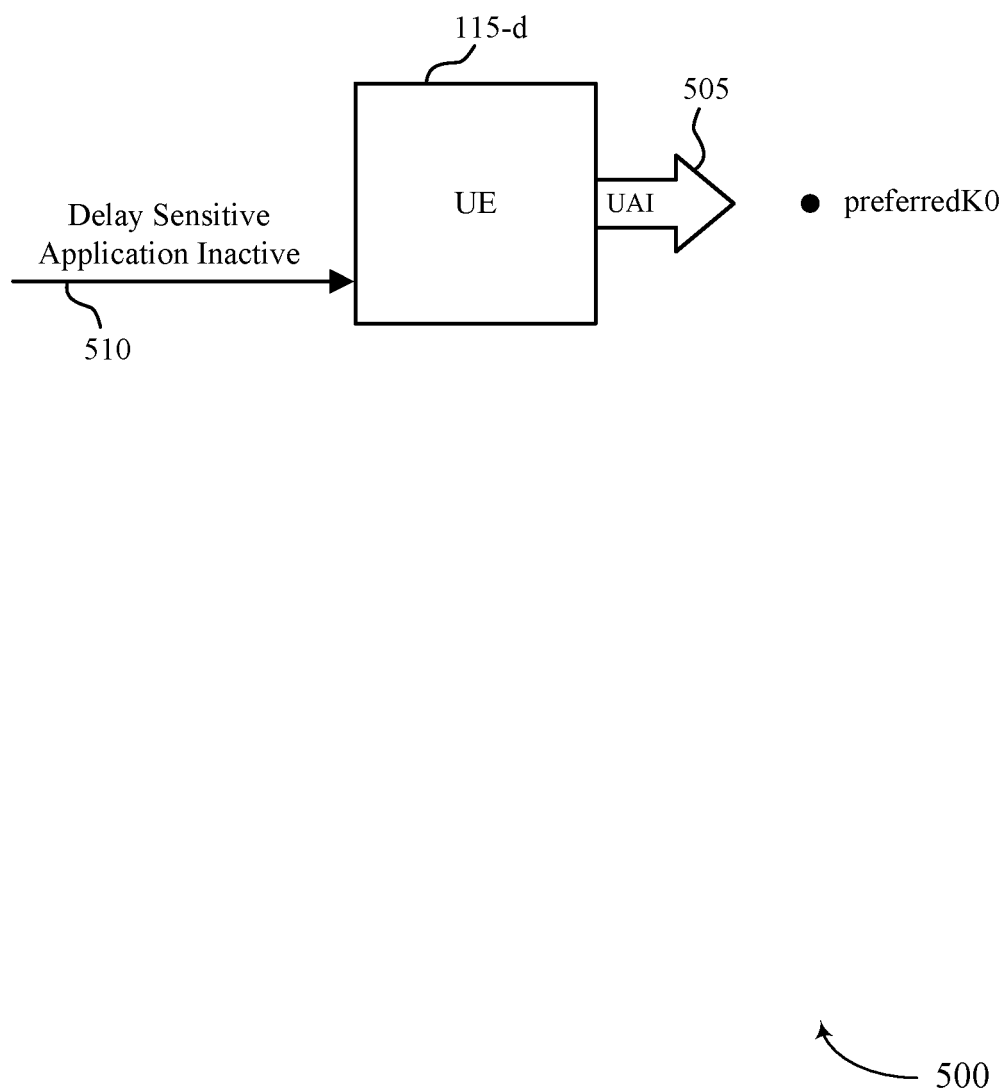
FIG. 5 illustrates an example of a triggering decision that supports techniques for providing assistance information for an increased minimum scheduling offset in accordance with aspects of the present disclosure.

FIG. 5 illustrates an example of a triggering decision 500 that supports techniques for providing assistance information 505 for an increased minimum scheduling offset in accordance with aspects of the present disclosure. For example, a UE 115-d (which may be an example of a corresponding device as described with reference to FIGS.

1 and 2) may employ the triggering decision 500 to determine whether or not to transmit assistance information 505 requesting an increase of a minimum scheduling offset configured at the UE 115-d. In other words, the triggering decision 500 may illustrate a triggering condition or threshold that prompts the UE 115-d to transmit assistance information 505 associated with the configured minimum scheduling offset. In some aspects, the assistance information 505 transmitted by the UE 115-d may be referred to as UAI.

As described with reference to FIG. 2, the UE 115-d may transmit the assistance information 505 including a UEAssistanceInformation(minSchedulingOffset-Preference) information element. The UEAssistanceInformation(minSchedulingOffset-Preference) information element may include a number of parameters, including a preferredK0 parameter. The preferredK0 parameter may include a number of sub-parameters for various subcarrier spacings (SCSs), including a preferredK0-SCS-15 kHz parameter, a preferredK0-SCS-30 kHz parameter, a preferredK0-SCS-60 kHz parameter, and a preferredK0-SCS-120 kHz parameter. As such, to convey the requested update or modification to the configured minimum scheduling offset, the UE 115-d may set one or more of the preferredK0-SCS-15 kHz parameter, the preferredK0-SCS-30 kHz parameter, the preferredK0-SCS-60 kHz parameter, or the preferredK0-SCS-120 kHz parameter to requested values.

In some cases, the UE 115-d may set the preferredK0-SCS-15 kHz parameter to 1, 2, 4, or 6 to indicate a request for a minimum scheduling offset to be configured as 1 slot, 2 slots, 4 slots, or 6 slots, respectively. Similarly, the UE 115-d may set the preferredK0-SCS-30 kHz parameter to 1, 2, 4, or 6 to indicate a request for a minimum scheduling offset to be configured as 1 slot, 2 slots, 4 slots, or 6 slots, respectively. Further, the UE 115-d may set the preferredK0-SCS-60 kHz parameter to 2, 4, 8, or 12 to indicate a request for a minimum scheduling offset to be configured as 2 slots, 4 slots, 8 slots, or 12 slots, respectively. Similarly, the UE 115-d may set the preferredK0-SCS-120 kHz parameter to 2, 4, 8, or 12 to indicate a request for a minimum scheduling offset to be configured as 2 slots, 4 slots, 8 slots, or 12 slots, respectively.

In some aspects, the triggering the condition or threshold associated with the triggering decision 500 may be equivalently referred to as a predetermined trigger threshold and the predetermined trigger threshold may be based on one or more conditions at the UE 115-d. For example, the predetermined trigger threshold may be based on whether or not an application of the UE 115-d has signaled a high latency issue or whether or not the application of the UE 115-d (e.g., an active application of the UE 115-d) is delay sensitive. In some examples, the UE 115-d may detect whether the predetermined trigger threshold is satisfied based on considering or accounting for the latency condition of the application of the UE 115-d via an input 510. Such an input 510 may function as an input into one or more processing operations that the UE 115-d may perform to detect whether or not the predetermined trigger threshold is satisfied at the UE 115-d.

For instance, if the UE 115-d detects that no delay sensitive application is active (such that any application of the UE 115-d is not delay sensitive or is otherwise associated with a latency condition less than a threshold latency), the UE 115-d may transmit assistance information 505 associated with the minimum scheduling offset via one more values of preferredK0. In some aspects, the UE 115-d may request a minimum scheduling offset value based on a physical downlink control channel (PDCCH) monitoring occasion (PMO) frequency or a radio frequency band over which the UE 115-d communicates, or both.

For example, if the UE 115-d communicates over an FR1 radio frequency band, detects that no delay sensitive application is active, detects that the UE 115-d has a PMO every slot, and detects that a current active BWP has a configured minimum scheduling offset of K0=0 (or no restriction), the UE 115-d may transmit assistance information 505 to the base station 105 requesting or otherwise indicating an increase of the configured minimum scheduling offset for the active BWP to one slot. In other words, the UE 115-d may request K0=1. In some aspects, the UE 115-d may convey the request for K0=1 to the base station 105 by setting the preferredK0-SCS-15 kHz parameter or the preferredK0-SCS-30 kHz parameter (depending on the SCS of the active BWP) to 1.

In some other examples, if the UE 115-d communicates over an FR2 radio frequency band, detects that no delay sensitive application is active, detects that the UE 115-d has a PMO every slot, and detects that a current active BWP has a configured minimum scheduling offset of K0=0 (or no restriction), the UE 115-d may transmit assistance information 505 to the base station 105 requesting or otherwise indicating an increase of the configured minimum scheduling offset for the active BWP to two slots. In other words, the UE 115-d may request K0=2. In some aspects, the UE 115-d may convey the request for K0=2 to the base station 105 by setting the preferredK0-SCS-60 kHz parameter or the preferredK0-SCS-120 kHz parameter (depending on the SCS of the active BWP) to 2.

In some other examples, if the UE 115-d detects that no delay sensitive application is active, detects that the UE 115-d has a PMO every two or three slots (or both), and detects that a current active BWP has a configured minimum scheduling offset of K0<2, the UE 115-d may transmit assistance information 505 to the base station 105 requesting or otherwise indicating an increase of the configured minimum scheduling offset for the active BWP to two slots. In other words, the UE 115-d may request K0=2. In some aspects, the UE 115-d may convey the request for K0=2 to the base station 105 by setting the preferredK0-SCS-15 kHz parameter, the preferredK0-SCS-30 kHz parameter, the preferredK0-SCS-60 kHz parameter, or the preferredK0-SCS-120 kHz parameter (depending on the SCS of the active BWP) to 2.

In some other examples, if the UE 115-d detects that no delay sensitive application is active and detects that the UE 115-d has a PMO every four slots, the UE 115-d may transmit assistance information 505 to the base station 105 requesting or otherwise indicating an increase of the configured minimum scheduling offset for the active BWP to four slots. In other words, the UE 115-d may request K0=4. In some aspects, the UE 115-d may convey the request for K0=4 to the base station 105 by setting the preferredK0-SCS-15 kHz parameter, the preferredK0-SCS-30 kHz parameter, the preferredK0-SCS-60 kHz parameter, or the preferredK0-SCS-120 kHz parameter (depending on the SCS of the active BWP) to 4.

In examples in which the UE 115-d detects that the predetermined trigger threshold is not satisfied, the UE 115-d may refrain from requesting an increase in the minimum scheduling offset that may be configured at the UE 115-d. In such examples, the UE 115-d may instead transmit assistance information 505 including an empty preferredK0 parameter. As such, in some cases, the base station 105 may transmit control signaling to the UE 115-d recovering the UE 115-d from an increased minimum scheduling offset.

In addition or as an alternative to determining whether the predetermined trigger threshold is satisfied, the UE 115-*d* may transmit assistance information 505 to the base station 105 based on receiving a command from the application or an operating system of the UE 115-*d*. For example, the application or the operating system of the UE 115-*d* may send a command to a modem of the UE 115-*d* via a modem control interface and the UE 115-*d* may transmit the assistance information 505 to the base station 105 based on receiving the command. In some examples, the command from the application or the operating system may provide (e.g., dynamically provide via the modem control interface) values for the preferredK0 parameters. In such examples, the application or the operating system may measure or perform decisions relating to the latency condition of the application or operating system.

Figure 6:
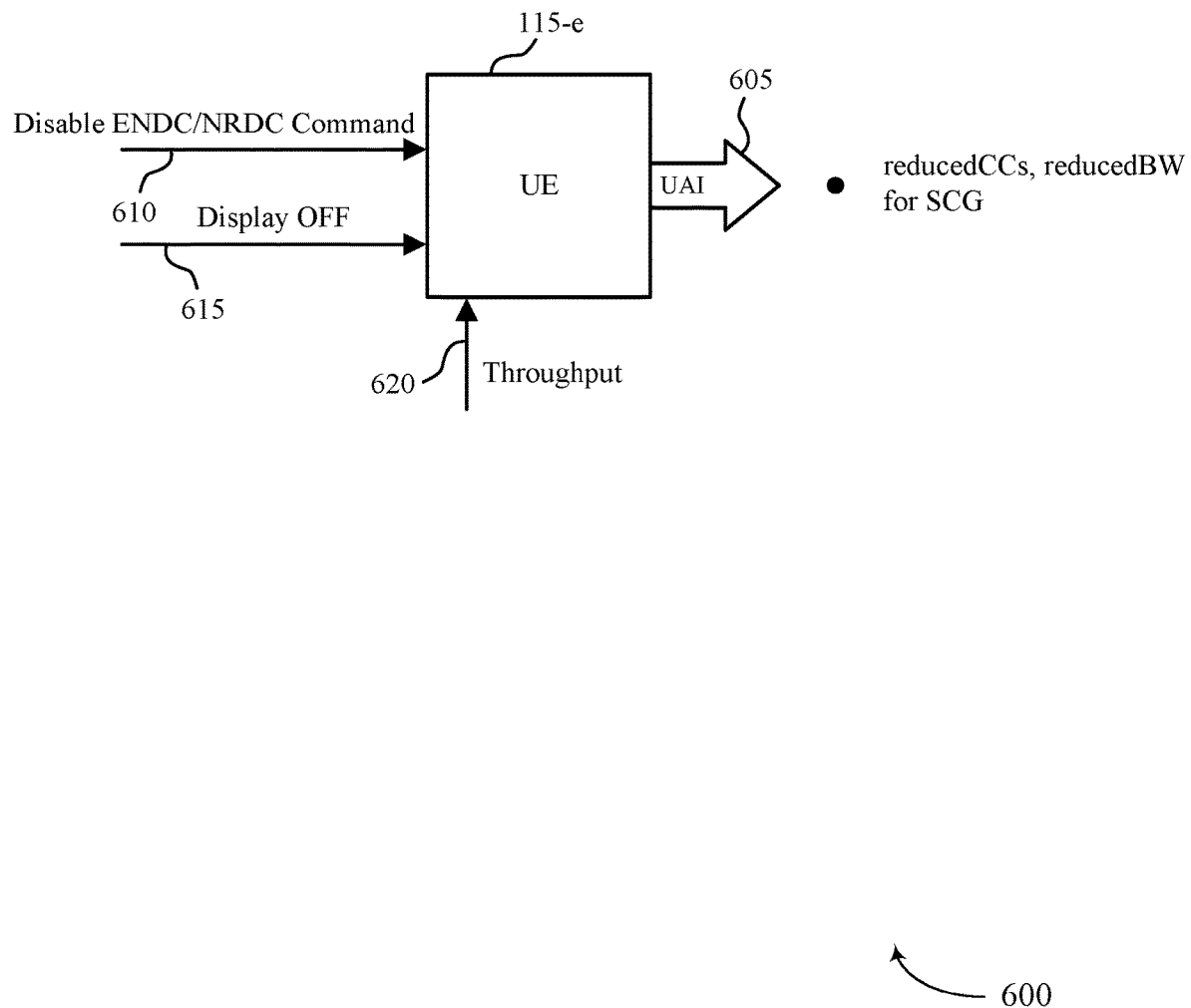
FIG. 6 illustrates an example of a triggering decision that supports techniques for providing assistance information for a reduced quantity of component carriers or a reduced aggregated bandwidth for a secondary cell group (SCG) in accordance with aspects of the present disclosure.

FIG. 6 illustrates an example of a triggering decision 600 that supports techniques for providing assistance information 605 for a reduced quantity of component carriers or a reduced aggregated bandwidth for an SCG in accordance with aspects of the present disclosure. For example, a UE 115-*e* (which may be an example of a corresponding device as described with reference to FIGS. 1 and 2) may employ the triggering decision 600 to determine whether or not to transmit assistance information 605 requesting a reduction of a maximum quantity of component carriers or a reduction of a maximum aggregated bandwidth for an SCG configured at the UE 115-*e*. In other words, the triggering decision 600 may illustrate a triggering condition or threshold that prompts the UE 115-*e* to transmit assistance information 605 associated with the configured maximum quantity of component carriers or the configured maximum aggregated bandwidth for the SCG. In some aspects, the assistance information 605 transmitted by the UE 115-*e* may be referred to as UAI.

As described with reference to FIG. 2, the UE 115-*e* may transmit the assistance information 605 including UEAssistanceInformation(maxBW-Preference, maxCC-Preference) information elements (which may be encapsulated as an UEInformationTransferMRDC(UEAssistanceInformation (maxBW-Preference, maxCC-Preference)) information element). The UEAssistanceInformation(maxBW-Preference, maxCC-Preference) information elements may include a number of parameters. For example, the maxBW-Preference information element may include a reducedMaxBW-FR1 parameter (which may further include a reducedBW-FR1-DL parameter and a reducedBW-FR1-UL parameter) and a reducedMaxBW-FR2 parameter (which may further include a reducedBW-FR2-DL parameter and a reducedBW-FR2-UL parameter). The maxCC-Preference information element may include a reducedCCsDL parameter and a reducedCCsUL parameter. In some aspects, the reducedBW parameter may refer to a total or aggregated bandwidth of the MCG or the SCG (depending on which radio frequency band the MCG and the SCG are configured in) and the reducedCCs parameter may refer to a quantity of secondary cells (SCells) in the MCG or a quantity of SCells and primary-secondary cells (PSCells) in the SCG.

In some cases, the UE 115-*e* may set one or more of the reducedBW-FR1-DL parameter, the reducedBW-FR1-UL parameter, the reducedBW-FR2-DL parameter, or the reducedBW-FR2-UL parameter to a ReducedAggregated-Bandwidth value to indicate a request for a maximum aggregated bandwidth for the SCG (or the MCG, or both, in some cases) to be configured as the ReducedAggregated-Bandwidth value. Further, the UE 115-*e* may set the reducedCCsDL parameter or the reducedCCs UL parameter to an integer between 0 and 31 to indicate a request for a maximum quantity of component carriers to be configured as the set integer (e.g., the integer between 0 and 31).

In some aspects, the triggering condition or threshold associated with the triggering decision 600 may be equivalently referred to as a predetermined trigger threshold and the predetermined trigger threshold may be based on one or more conditions at the UE 115-*e*. For example, the predetermined trigger threshold may be based on a throughput between the UE 115-*e* and the base station 105 (e.g., an uplink throughput or a downlink throughput, or both), whether or not an application or operating system of the UE 115-*e* signals that a display is in an "OFF" state, or whether or not the UE 115-*e* receives a command to disable DC via a modem control interface, or a combination thereof. In some examples, the UE 115-*e* may detect whether the predetermined trigger threshold is satisfied based on considering or accounting for the command to disable DC via an input 610, based on considering or accounting for the indication that the display is in an "OFF" state via an input 615, or based on considering or accounting for the throughput between the UE 115-*e* and the base station 105 via an input 620. Such an input 610, an input 615, and an input 620 may function as inputs into one or more processing operations that the UE 115-*e* may perform to detect whether or not the predetermined trigger threshold is satisfied at the UE 115-*e*.

For instance, if the UE 115-*e* detects that a display status is not used (e.g., as an input) and detects that a throughput between the UE 115-*e* and the base station 105 is less than a threshold throughput, the UE 115-*e* may transmit assistance information 605 to the base station 105 requesting or otherwise indicating a reduction (such as a reduction to zero) of the maximum quantity of component carriers that may be configured at the UE 115-*e* or a reduction (such as a reduction to zero) of the maximum aggregated bandwidth over which the UE 115-*e* may communicate with the SCG. Similarly, if the UE 115-*e* detects that a display status is not used (e.g., as an input), detects that a throughput between the UE 115-*e* and the base station 105 is less than a threshold throughput, and detects that the application or operating system of the UE 115-*e* signals that a display is in an "OFF" state, the UE 115-*e* may transmit assistance information 605 to the base station 105 requesting or otherwise indicating a reduction (such as a reduction to zero) of the maximum quantity of component carriers that may be configured at the UE 115-*e* or a reduction (such as a reduction to zero) of the maximum aggregated bandwidth over which the UE 115-*e* may communicate with the SCG. Additionally or alternatively, if the UE 115-*e* receives a command to disable DC via a modem control interface of the UE 115-*e* (such as from the application or operating system of the UE 115-*e*), the UE 115-*e* may transmit assistance information 605 to the base station 105 requesting or otherwise indicating a reduction (such as a reduction to zero) of the maximum quantity of component carriers that may be configured at the UE 115-*e* or a reduction (such as a reduction to zero) of the maximum aggregated bandwidth over which the UE 115-*e* may communicate with the SCG.

In some implementations, the UE 115-*e* may further qualify whether or not to transmit the assistance information 605 based on whether or not a response is seen to a previous transmission of assistance information 605, if the network supports the assistance information parameter, and whether or not the UE 115-*e* is operating in a DC deployment at the time the UE 115-*e* determines that the predetermined trigger threshold is satisfied. In implementations in which no response from the base station 105 to the previous transmission of assistance information 605 is not seen (such that the base station 105 provided a response to the previous transmission of assistance information 605) and if the network supports assistance information 605 for the maximum quantity of component carriers or the maximum aggregated bandwidth for the SCG, the UE 115-e may transmit the assistance information 605. In some aspects, the UE 115-e may transmit the assistance information 605 per cell group or per radio frequency range. For example, if the UE 115-e is configured for communication over an FR1 radio frequency band (e.g., if the SCG is configured within an FR1 radio frequency band), the UE 115-e may set reducedCCsDL=0 and reducedCCsUL=0 or may set reducedBW-FR1-DL=0 and reducedBW-FR1-UL=0. Alternatively, if the UE 115-e is configured for communication over an FR2 radio frequency band (e.g., if the SCG is configured within an FR2 radio frequency band), the UE 115-e may set reducedCCsDL=0 and reducedCCsUL=0 or may set reducedBW-FR2-DL=0 and reducedBW-FR2-UL=0.

In examples in which the UE 115-e detects that the predetermined trigger threshold is not satisfied (or is no longer satisfied), the UE 115-e may refrain from requesting a reduction in the maximum quantity of component carriers or the maximum aggregated bandwidth for the SCG. In such examples, the UE 115-e may instead transmit assistance information 605 including one or more empty parameters. For example, the UE 115-e may transmit assistance information 605 including an empty reducedCCsDL parameter, an empty reducedCCs UL parameter, an empty reducedBW-FR1-DL parameter, an empty reducedBW-FR1-UL parameter, an empty reducedBW-FR2-DL parameter, or an empty reducedBW-FR2-UL parameter, or a combination thereof.

The UE 115-e may monitor for a response from the base station 105 based on transmitting the assistance information 605. In examples in which the UE 115-e transmits the assistance information 605 requesting a reduction of the maximum quantity of component carriers to zero or a reduction of the maximum aggregated bandwidth for the SCG to zero, the UE 115-e may monitor for control signaling releasing the requested component carriers, which may include one or more SCells in the MCG or one or more SCells and PSCells in the SCG, or releasing the SCG (in its entirety). In such examples, if the UE 115-e fails to receive a response from the base station 105 releasing the SCG, the UE 115-e may trigger SCG radio link failure (RLF). Additional details relating to such declaration of RLF based on failing to receive control signaling from the base station 105 responsive to the assistance information 605 are described herein, including with reference to FIGS. 9 and 10.

Figure 7:
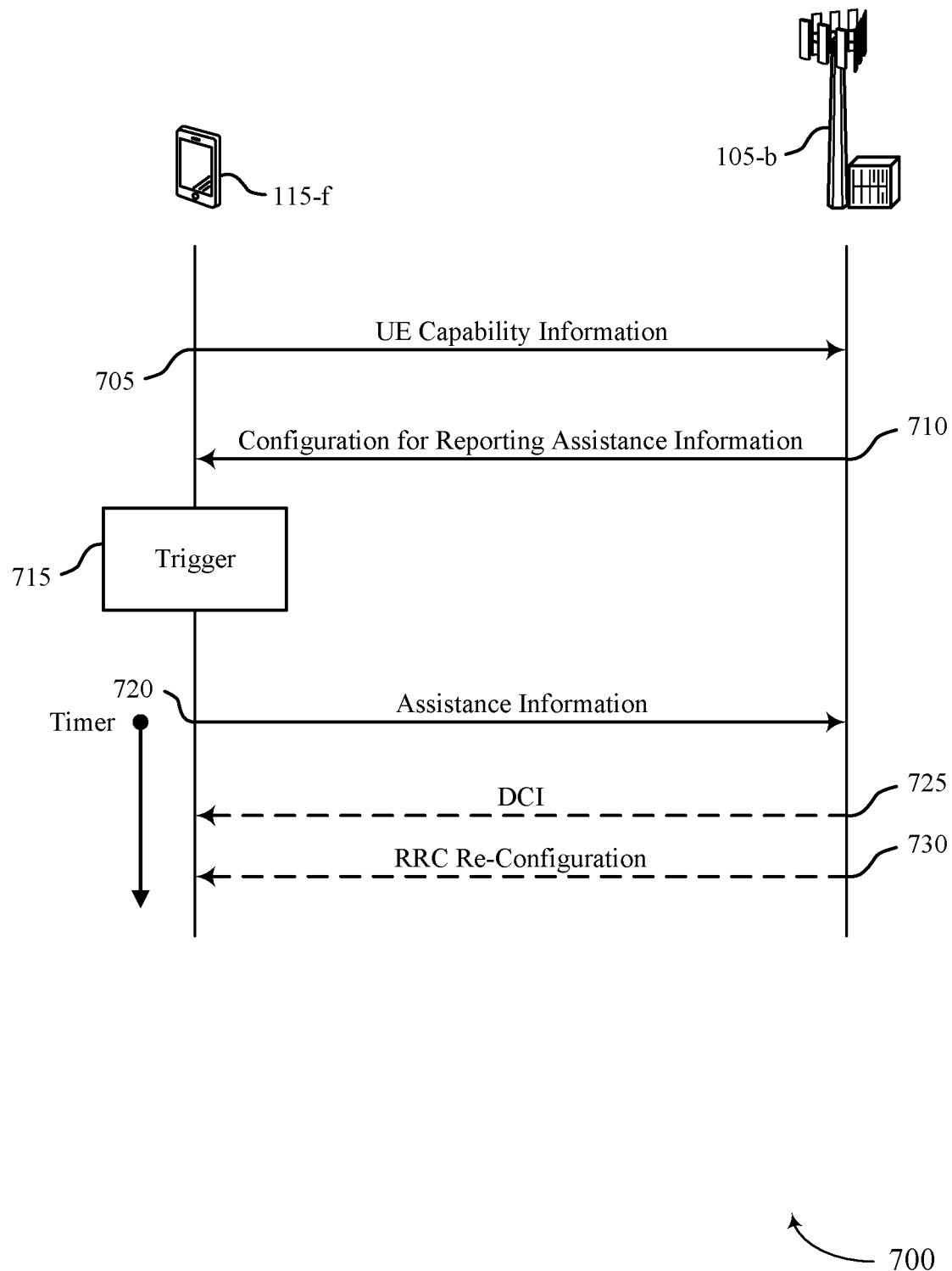
FIGS. 7 and 8 illustrate examples of process flows that support techniques for providing assistance information for one or more communication parameters in accordance with aspects of the present disclosure.

FIG. 7 illustrates an example of a process flow 700 that supports techniques for providing assistance information for one or more communication parameters in accordance with aspects of the present disclosure. The process flow 700 illustrates standalone communication between a UE 115-f and a base station 105-b, which may be examples of corresponding devices as described herein, including with reference to FIGS. 1 and 2. In some examples, the UE 115-f may transmit, to the base station 105-b, assistance information associated with one or more communication parameters, such as a configured maximum quantity of uplink MIMO layers, a configured maximum quantity of downlink MIMO layers, or a configured minimum scheduling offset, or a combination thereof, based on satisfying a triggering condition or threshold at the UE 115-f.

At 705, the UE 115-f may transmit, to the base station 105-b, signaling indicating a capability of the UE 115-f (e.g., UE capability information) for the reporting of assistance information. In some examples, the UE 115-f may transmit the signaling indicating the capability of the UE 115-f via one or more information elements, such as a UECapabilityInformation information element. In some aspects, the contents of the UECapabilityInformation information element may vary based on for which communication parameter the UE 115-f is conveying a capability for reporting assistance information.

For instance, if the UE 115-f is capable of reporting assistance information for the maximum quantity of uplink MIMO layers that may be configured at the UE 115-f, the UE 115-f may transmit a UECapabilityInformation(maxMIMO-LayerPreference) information element. Additionally or alternatively, if the UE 115-f is capable of reporting assistance information for the maximum quantity of downlink MIMO layers that may be configured at the UE 115-f, the UE 115-f may transmit a UECapabilityInformation(maxMIMO-LayerPreference) information element. (e.g., the UE 115-f may convey a capability for both uplink MIMO layers and downlink MIMO layers via the same UECapabilityInformation(maxMIMO-LayerPreference) information element). Additionally or alternatively, if the UE 115-f is capable of reporting assistance information for the minimum scheduling offset that may be configured at the UE 115-f, the UE 115-f may transmit a UECapabilityInformation(minSchedulingOffset-Preference) information element. Additional details relating to such signaling of UE capability information are described herein, including with reference to FIG. 2.

At 710, the UE 115-f may receive, from the base station 105-b, a configuration for reporting assistance information based on the capability of the UE 115-f. In some examples, the UE 115-f may receive the configuration via RRC signaling, such as via an RRCReconfiguration information element, and responsive to transmitting the UE capability information. Further, the contents of the RRCReconfiguration information element may be based on the communication parameter configured by the configuration signaling. For example, if the base station 105-b configures the maximum quantity of uplink MIMO layers or the maximum quantity of downlink MIMO layers, or both, the base station 105-b may transmit the configuration via an RRCReconfiguration(otherConfig(maxMIMO-LayerPreferenceConfig)) information element. Additionally or alternatively, if the base station 105-b configures the minimum scheduling offset, the base station 105-b may transmit the configuration via an RRCReconfiguration(otherConfig(minSchedulingOffset-PreferenceConfig)) information element.

At 715, the UE 115-f may detect or otherwise determine that the UE 115-f satisfies a predetermined trigger threshold (or multiple predetermined trigger thresholds). For example, the UE 115-f may determine that the UE 115-f satisfies a first predetermined trigger threshold for transmitting assistance information associated with the maximum quantity of uplink MIMO layers, a second predetermined trigger threshold for transmitting assistance information associated with the maximum quantity of downlink MIMO layers, or a third predetermined trigger threshold for transmitting assistance information associated with the minimum scheduling offset, or a combination thereof.

In some aspects, satisfying the first predetermined trigger threshold may include detecting that a latency condition of an application of the UE 115-f is less than a threshold latency, detecting that an uplink throughput from the UE 115-f is less than a threshold throughput, detecting that an uplink BLER is greater than a threshold BLER, or detecting that an amount of data in a buffer (such as a PDCP buffer) is less than a threshold amount of data, or any combination thereof. Additional details relating to such a first predetermined trigger threshold are described herein, including with reference to FIG. 3. Further, satisfying the second predetermined trigger threshold may include detecting that the latency condition of the application of the UE 115-*f* is less than the threshold latency or detecting that a downlink throughput to the UE 115-*f* is less than a threshold throughput, or both. Additional details relating to such a second predetermined trigger threshold are described herein, including with reference to FIG. 4. Further, satisfying the third predetermined trigger threshold may include detecting that the latency condition of the application of the UE 115-*f* is less than the threshold latency. Additional details relating to such a third predetermined trigger threshold are described herein, including with reference to FIG. 5.

At 720, the UE 115-*f* may transmit assistance information for one or more communication parameters based on satisfying the predetermined trigger threshold (or the multiple predetermined trigger thresholds). For instance, in examples in which the UE 115-*f* detects that the UE 115-*f* satisfies the first predetermined trigger threshold, the UE 115-*f* may transmit assistance information associated with the maximum quantity of uplink MIMO layers that may be configured at the UE 115-*f* (as described in more detail with reference to FIG. 3). Additionally or alternatively, in examples in which the UE 115-*f* detects that the UE 115-*f* satisfies the second predetermined trigger threshold, the UE 115-*f* may transmit assistance information associated with the maximum quantity of downlink MIMO layers that may be configured at the UE 115-*f* (as described in more detail with reference to FIG. 4). Additionally or alternatively, in examples in which the UE 115-*f* detects that the UE 115-*f* satisfies the third predetermined trigger threshold, the UE 115-*f* may transmit assistance information associated with the minimum scheduling offset that may be configured at the UE 115-*f* (as described in more detail with reference to FIG. 5).

In some examples, the UE 115-*f* may start a timer based on transmitting the assistance information. The timer may be configured at the UE 115-*f* by the base station 105-*b* or the network via a PreferenceProhibitTimer information element and the timer may prohibit the UE 115-*f* from sending additional assistance information associated with a same communication parameter for the duration of the timer. For example, if the UE 115-*f* transmits the assistance information associated with the maximum quantity of uplink MIMO layers at a first occasion, the UE 115-*f* may refrain from sending assistance information associated with the maximum quantity of uplink MIMO layers for the duration of the timer measured from the first occasion (which may be configured as Timer T346d for maxMIMO-LayerPreferenceProhibitTimer). Similarly, if the UE 115-*f* transmits the assistance information associated with the maximum quantity of downlink MIMO layers at a first occasion, the UE 115-*f* may refrain from sending assistance information associated with the maximum quantity of downlink MIMO layers for the duration of the timer measured from the first occasion (which may also be configured as Timer T346d for maxMIMO-LayerPreferenceProhibitTimer). Additionally or alternatively, if the UE 115-*f* transmits the assistance information associated with the minimum scheduling offset at a first occasion, the UE 115-*f* may refrain from sending assistance information associated with the minimum scheduling offset for the duration of the timer measured from the first occasion (which may be configured as Timer 346e for minSchedulingOffsetPreferenceProhibitTimer).

At 725, in some implementations, the UE 115-*f* may receive, from the base station 105-*b*, control signaling (such as DCI) indicating a re-configuration of the one or more communication parameters based on the assistance information provided by the UE 115-*f*. In examples in which the base station 105-*b* transmits the control signaling via DCI, the DCI may indicate a switch from one active bandwidth part to another active bandwidth part that satisfies the requested update or modification indicated by the assistance information transmitted at 720. Additionally or alternatively, the DCI may indicate (e.g., dynamically) an updated configuration at the UE 115-*f*. For example, the DCI may indicate a change between two RRC-configured values (which may be configured, such as previously configured, at the UE 115-*f* via RRC signaling). For instance, the DCI may indicate a switch from a first scheduling offset value to a second scheduling offset value (where the first and second scheduling offset values are greater than an RRC configured minimum scheduling offset value). Additional details relating to such DCI-based control signaling in response to assistance information are described herein, including with reference to FIG. 2.

At 730, in some implementations, the UE 115-*f* may receive, from the base station 105-*b*, control signaling (such as RRC signaling) indicating a re-configuration of the one or more communication parameters based on the assistance information provided by the UE 115-*f*. In examples in which the base station 105-*b* transmits the control signaling via RRC signaling, the RRC signaling may indicate one or more re-configured (or updated) values for the one or more communication parameters. Additional details relating to such RRC-based control signaling in response to assistance information are described herein, including with reference to FIG. 2.

Figure 8:
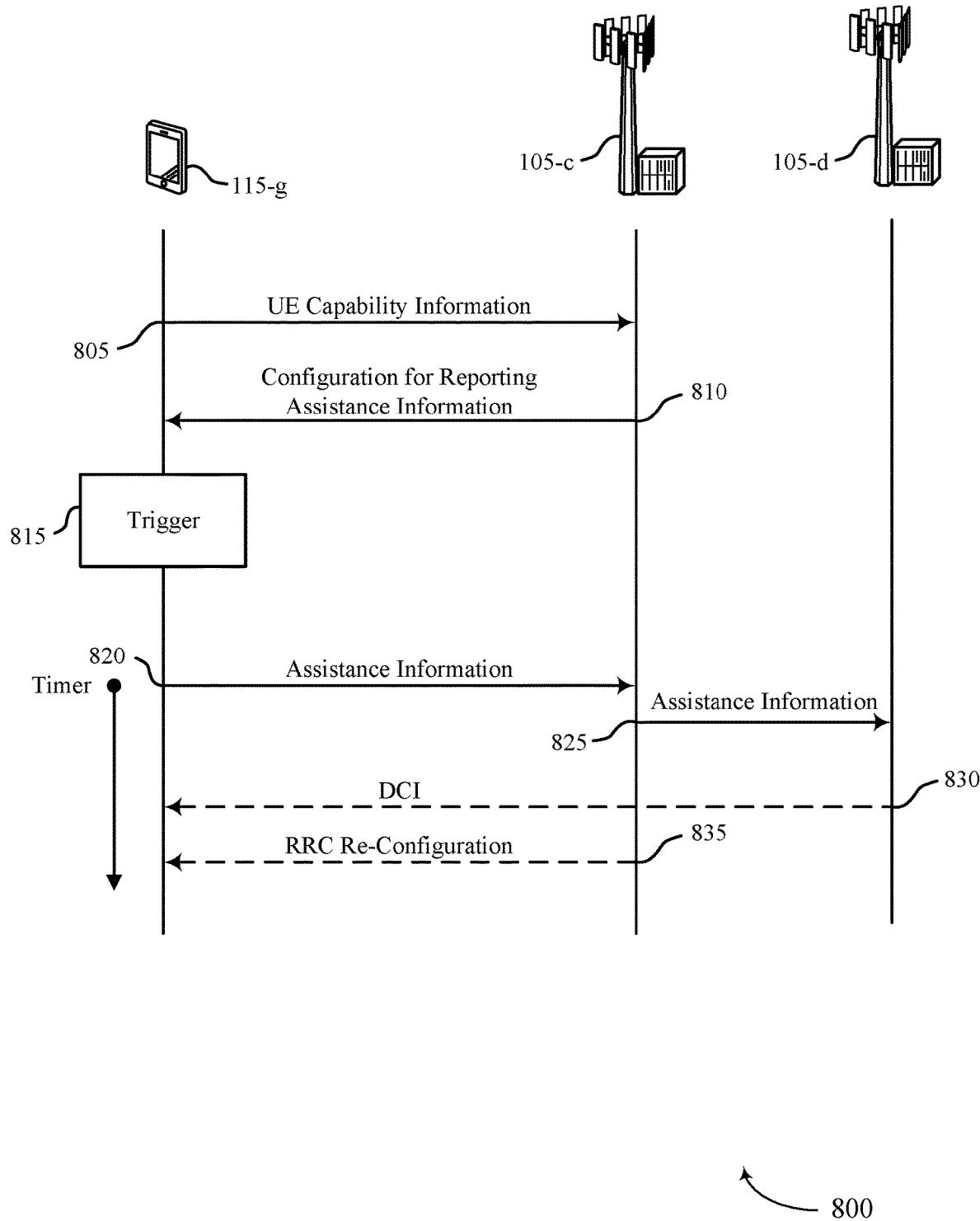

FIG. 8 illustrates an example of a process flow 800 that supports techniques for providing assistance information for one or more communication parameters in accordance with aspects of the present disclosure. The process flow 800 illustrates DC non-standalone communication between a UE 115-*g*, a base station 105-*c*, and a base station 105-*d*, which may be examples of corresponding devices as described herein, including with reference to FIGS. 1 and 2. For example, the UE 115-*g*, the base station 105-*c*, and the base station 105-*d* may communicate within a DC non-standalone deployment, such as an Evolved Universal Terrestrial Radio Access Network (E-UTRAN) New Radio-DC (ENDC) or New Radio-DC (NRDC) deployment. In some examples, the UE 115-*g* may transmit, to the base station 105-*c*, assistance information associated with one or more communication parameters, such as a configured maximum quantity of uplink MIMO layers, a configured maximum quantity of downlink MIMO layers, or a configured minimum scheduling offset, or a combination thereof, based on satisfying a triggering condition or threshold at the UE 115-*g*.

At 805, the UE 115-*g* may transmit, to the base station 105-*c*, signaling indicating a capability of the UE 115-*g* (e.g., UE capability information) for the reporting of assistance information. In some examples, the UE 115-*g* may transmit the signaling indicating the capability of the UE 115-*g* via one or more information elements, such as a UECapabilityInformation information element. In some aspects, the contents of the UECapabilityInformation information element may vary based on for which communication parameter the UE 115-*g* is conveying a capability for reporting assistance information. Additional details relating to such signaling of UE capability information are described herein, including with reference to FIGS. 2 and 7.

At 810, the UE 115-g may receive, from the base station 105-c, a configuration for reporting assistance information based on the capability of the UE 115-g. In some examples, the UE 115-g may receive the configuration via RRC signaling, such as via an RRC(Connection)Reconfiguration information element, and responsive to transmitting the UE capability information. Further, the contents of the RRC (Connection)Reconfiguration information element may be based on the communication parameter configured by the configuration signaling. For example, if the base station 105-c configures the maximum quantity of uplink MIMO layers or the maximum quantity of downlink MIMO layers, or both, the base station 105-c may transmit the configuration via an RRC(Connection)Reconfiguration(RRCReconfiguration(otherConfig(maxMIMO-Layer PreferenceConfig))) information element. Additionally or alternatively, if the base station 105-c configures the minimum scheduling offset, the base station 105-c may transmit the configuration via an RRC(Connection)Reconfiguration(RRCReconfiguration(otherConfig(minSchedulingOffset-PreferenceConfig))) information element. As referred to herein, via the RRC (Connection)Reconfiguration information element may mean, be defined as, or otherwise refer to or include via an RRCConnectionReconfiguration information element in the ENDC and via an RRCReconfiguration information element in the NRDC.

At 815, the UE 115-g may detect or otherwise determine that the UE 115-g satisfies a predetermined trigger threshold (or multiple predetermined trigger thresholds). For example, the UE 115-g may determine that the UE 115-g satisfies a first predetermined trigger threshold for transmitting assistance information associated with the maximum quantity of uplink MIMO layers, a second predetermined trigger threshold for transmitting assistance information associated with the maximum quantity of downlink MIMO layers, or a third predetermined trigger threshold for transmitting assistance information associated with the minimum scheduling offset, or a combination thereof. Additional details relating to such predetermined trigger thresholds are described herein, including with reference to FIGS. 3 through 5 and 7.

At 820, the UE 115-g may transmit assistance information for one or more communication parameters based on satisfying the predetermined trigger threshold (or the multiple predetermined trigger thresholds). For instance, in examples in which the UE 115-g detects that the UE 115-g satisfies the first predetermined trigger threshold, the UE 115-g may transmit assistance information associated with the maximum quantity of uplink MIMO layers that may be configured at the UE 115-g (as described in more detail with reference to FIG. 3). In such examples, the UE 115-g may transmit the assistance information via an ULInformationTransferMRDC(UEAssistanceInformation(maxMIMO-LayerPreference)) information element.

Additionally or alternatively, in examples in which the UE 115-g detects that the UE 115-g satisfies the second predetermined trigger threshold, the UE 115-g may transmit assistance information associated with the maximum quantity of downlink MIMO layers that may be configured at the UE 115-g (as described in more detail with reference to FIG. 4). In such examples, the UE 115-g may also transmit the assistance information via an ULInformationTransferMRDC(UEAssistanceInformation(maxMIMO-LayerPreference)) information element. Additionally or alternatively, in examples in which the UE 115-g detects that the UE 115-g satisfies the third predetermined trigger threshold, the UE 115-g may transmit assistance information associated with the minimum scheduling offset that may be configured at the UE 115-g (as described in more detail with reference to FIG. 5). In such examples, the UE 115-g may transmit the assistance information via an ULInformationTransferMRDC(UEAssistanceInformation(minSchedulingOffset-Preference)) information element.

In some examples, the UE 115-g may start a timer based on transmitting the assistance information. The timer may be configured at the UE 115-g by the base station 105-c, the base station 105-d, or the network via a PreferenceProhibitTimer information element and the timer may prohibit the UE 115-g from sending additional assistance information associated with a same communication parameter for the duration of the timer. For example, if the UE 115-g transmits the assistance information associated with the maximum quantity of uplink MIMO layers at a first occasion, the UE 115-g may refrain from sending assistance information associated with the maximum quantity of uplink MIMO layers for the duration of the timer measured from the first occasion (which may be configured as Timer T346d for maxMIMO-LayerPreferenceProhibitTimer). Similarly, if the UE 115-g transmits the assistance information associated with the maximum quantity of downlink MIMO layers at a first occasion, the UE 115-g may refrain from sending assistance information associated with the maximum quantity of downlink MIMO layers for the duration of the timer measured from the first occasion (which may also be configured as Timer T346d for maxMIMO-LayerPreferenceProhibitTimer). Additionally or alternatively, if the UE 115-g transmits the assistance information associated with the minimum scheduling offset at a first occasion, the UE 115-g may refrain from sending assistance information associated with the minimum scheduling offset for the duration of the timer measured from the first occasion (which may be configured as Timer 346e for minSchedulingOffsetPreferenceProhibitTimer).

At 825, the base station 105-c may transmit the assistance information to the base station 105-d. For example, the base station 105-c may relay or otherwise forward the assistance information received from the UE 115-g to the base station 105-d.

At 830, in some implementations, the base station 105-d may transmit, to the UE 115-g, control signaling (such as DCI) indicating a re-configuration of the one or more communication parameters based on the assistance information provided by the UE 115-g (and relayed by the base station 105-c). In examples in which the base station 105-d transmits the control signaling via DCI, the DCI may indicate a switch from one active bandwidth part to another active bandwidth part that satisfies the requested update or modification indicated by the assistance information transmitted at 820. Additionally or alternatively, the DCI may indicate (e.g., dynamically) an updated configuration at the UE 115-g. For example, the DCI may indicate a change between two RRC-configured values (which may be configured, such as previously configured, at the UE 115-g via RRC signaling). Additional details relating to such DCI-based control signaling in response to assistance information are described herein, including with reference to FIG. 2.

At 835, in some implementations, the UE 115-g may receive, from the base station 105-c, control signaling (such as RRC signaling) indicating a re-configuration of the one or more communication parameters based on the assistance information provided by the UE 115-g. In examples in which the base station 105-c transmits the control signaling via RRC signaling, the RRC signaling may indicate one or more re-configured (or updated) values for the one or more communication parameters. Additional details relating to such RRC-based control signaling in response to assistance information are described herein, including with reference to FIG. 2.

Figure 9:
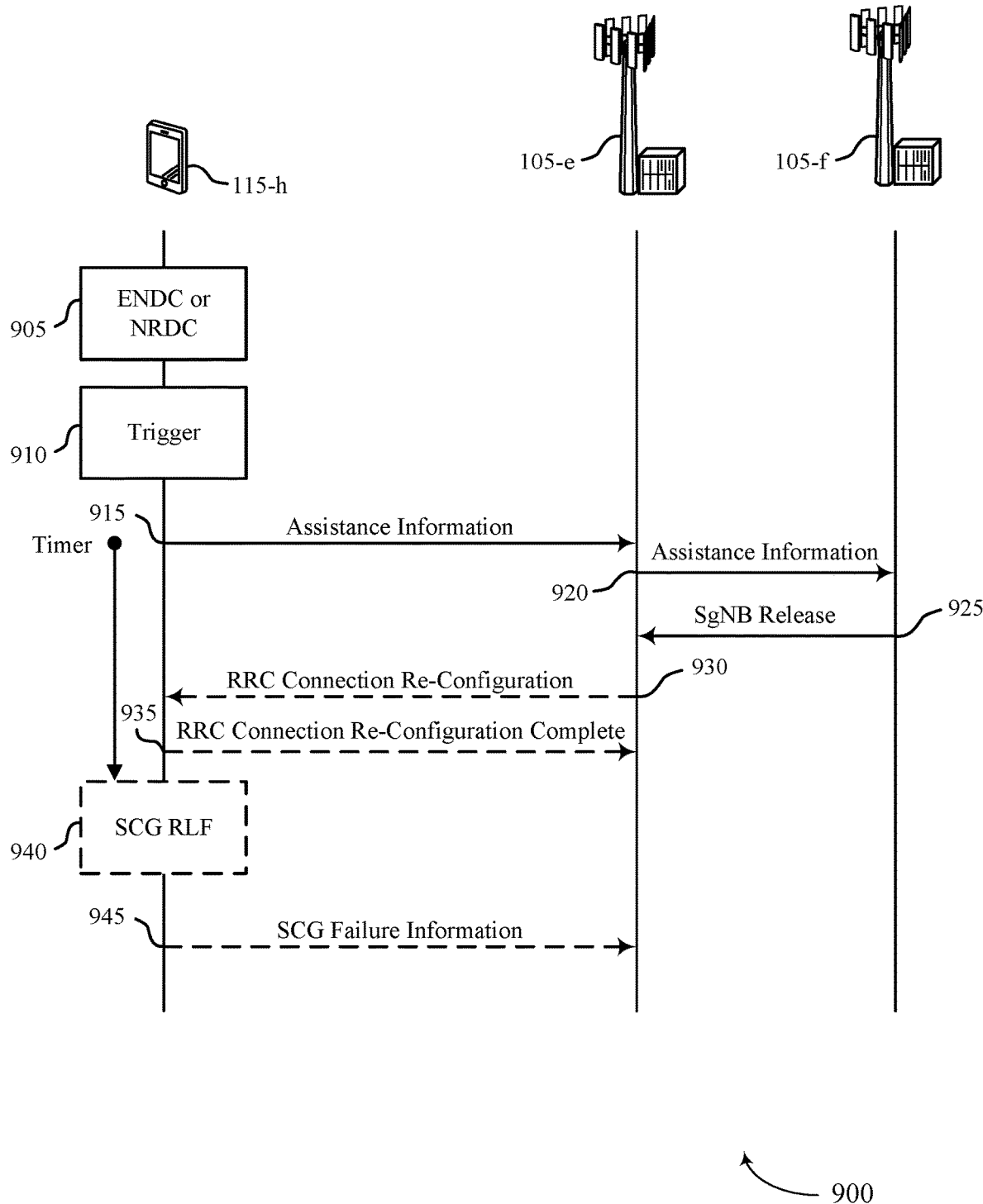
FIGS. 9 and 10 illustrate examples of process flows that support techniques for providing assistance information for releasing an SCG in accordance with aspects of the present disclosure.

FIG. 9 illustrates an example of a process flow 900 that supports techniques for providing assistance information for releasing an SCG in accordance with aspects of the present disclosure. The process flow 900 illustrates DC non-standalone communication between a UE 115-*h*, a base station 105-*e* (which may function as a primary base station 105, such as a master-eNB (M-eNB) or a master gNB (M-gNB)), and a base station 105-*f* (which may function as a secondary base station 105, such as a secondary-gNB (S-gNB)), which may be examples of corresponding devices as described herein, including with reference to FIGS. 1 and 2. For example, the UE 115-*h*, the base station 105-*e*, and the base station 105-*f* may enter or otherwise operate within an ENDC or an NRDC deployment. In some examples, the UE 115-*h* may enter or otherwise operate in the ENDC or NRDC deployment prior to detecting that a triggering condition is satisfied and may transmit assistance information associated with a configured maximum quantity of component carriers or a configured maximum aggregated bandwidth for a SCG based on detecting that the triggering condition is satisfied.

At 905, the UE 115-*h* may enter or otherwise operate in an ENDC or an NRDC deployment with the base station 105-*e* and the base station 105-*f*. For example, the UE 115-*h* may communicate with the base station 105-*e* as an M-eNB or an M-gNB and the UE 115-*h* may communicate with the base station 105-*f* as an S-gNB.

At 910, the UE 115-*h* may detect or otherwise determine that the UE 115-*h* satisfies a predetermined trigger threshold (or multiple predetermined trigger thresholds). For example, the UE 115-*h* may determine that the UE 115-*h* satisfies a first predetermined trigger threshold for transmitting assistance information associated with the maximum quantity of component carriers or the maximum aggregated bandwidth for the SCG. Additional details relating to such a predetermined trigger threshold are described herein, including with reference to FIG. 6.

At 915, the UE 115-*h* may transmit assistance information for the quantity of component carriers or the aggregated bandwidth for the SCG based on satisfying the predetermined trigger threshold. For instance, in examples in which the UE 115-*h* detects that the UE 115-*h* satisfies the first predetermined trigger threshold, the UE 115-*h* may transmit assistance information associated with the maximum quantity of component carriers or the maximum aggregated bandwidth for the SCG (as described in more detail with reference to FIG. 6). In such examples, the UE 115-*h* may transmit the assistance information via an ULInformationTransferMRDC(UEAssistanceInformation(maxBW-Preference, maxCC-Preference)) information element. In some aspects, the UE 115-*h* may request a release of the SCG in the ENDC or the NRDC deployment via the assistance information. For example, upon detecting that the condition to trigger the transmission of the assistance information is met, the UE 115-*h* may send the assistance information requesting a release of the SCG in the ENDC or the NRDC deployment.

In some examples, the UE 115-*h* may start a timer based on transmitting the assistance information. The timer may be configured at the UE 115-*h* by the base station 105-*e*, the base station 105-*f*, or the network. In some aspects, the timer may be referred to as or otherwise understood as a timer T_wait. The timer T_wait may define a time duration during which the UE 115-*h* expects to receive or otherwise monitors for control signaling (such as RRC re-configuration signaling) from the base station 105-*e* or the base station 105-*f* releasing the SCG.

At 920, the base station 105-*e* may transmit the assistance information to the base station 105-*f*. For example, the base station 105-*e* may relay or otherwise forward the assistance information received from the UE 115-*h* to the base station 105-*f*. The base station 105-*e* may transmit the assistance information via an RRCTransfer(UEAssistanceInformation) information element.

At 925, the base station 105-*f* may transmit, to the base station 105-*e*, signaling indicating an SgNB release (to satisfy the assistance information). For example, the assistance information provided by the UE 115-*h* may request that the configured maximum quantity of component carriers is reduced to zero or that the configured maximum aggregated bandwidth for the SCG is reduced to zero, which may cause or otherwise result in a determination at the base station 105-*f* that the SgNB may be released to satisfy the assistance information.

At 930, in some implementations, the UE 115-*h* may receive control signaling from the base station 105-*e* based on the assistance information provided by the UE 115-*h*. In some examples, the control signaling may include RRC signaling, and the base station 105-*e* may transmit the control signaling via an RRCConnectionReconfiguration (nr-Config→Release) information element in the ENDC or an RRCReconfiguration(mrdc-SecondaryCellGroupConfig→Release) information element in the NRDC. In such examples, the control signaling may include a command to release the SCG from the ENDC or the NRDC deployment (e.g., in accordance with the request from the UE 115-*h* provided by the assistance information).

At 935, in implementations in which the UE 115-*h* receives the control signaling at 930, the UE 115-*h* may transmit control signaling to the base station 105-*e* completing the release of the SCG initiated by the base station 105-*e* at 930. In some aspects, the UE 115-*h* may transmit the control signaling completing the re-configuration via an RRC(Connection)ReconfigurationComplete information element. As referred to herein, via the RRC(Connection)ReconfigurationComplete information element may mean, be defined as, or otherwise refer to or include via an RRCConnectionReconfigurationComplete information element in the ENDC and via an RRCReconfigurationComplete information element in the NRDC. In some examples, the UE 115-*h* may receive the control signaling including the command to release the SCG from the ENDC or the NRDC deployment prior to expiration of the timer T_wait and the UE 115-*h*, the base station 105-*e*, or the base station 105-*f* may end the procedure. In some other examples, however, the UE 115-*h* may fail to receive the control signaling including the command to release the SCG from the ENDC or the NRDC deployment prior to expiration of the timer T_wait and, in such examples, the UE 115-*h* may initiate an RLF for the SCG.

At 940, for example, the UE 115-*h* may initiate the RLF for the SCG basing on receiving the control signaling releasing the SCG from the base station 105-*e* after expiration of the timer T_wait. In some examples, initiating the SCG RLF may include suspending the SCG (e.g., suspending communication with the SCG).

At 945, the UE 115-*h* may transmit SCG failure information to the base station 105-*e* to inform the base station 105-*e* (e.g., the radio access network (RAN)) of the SCG RLF initiated at the UE 115-*h*. In some aspects, the UE 115-*h* may transmit the SCG failure information via an SCGFailureInformationNR information element in the ENDC or an SCGFailureInformation information element in the NRDC.

Figure 10:
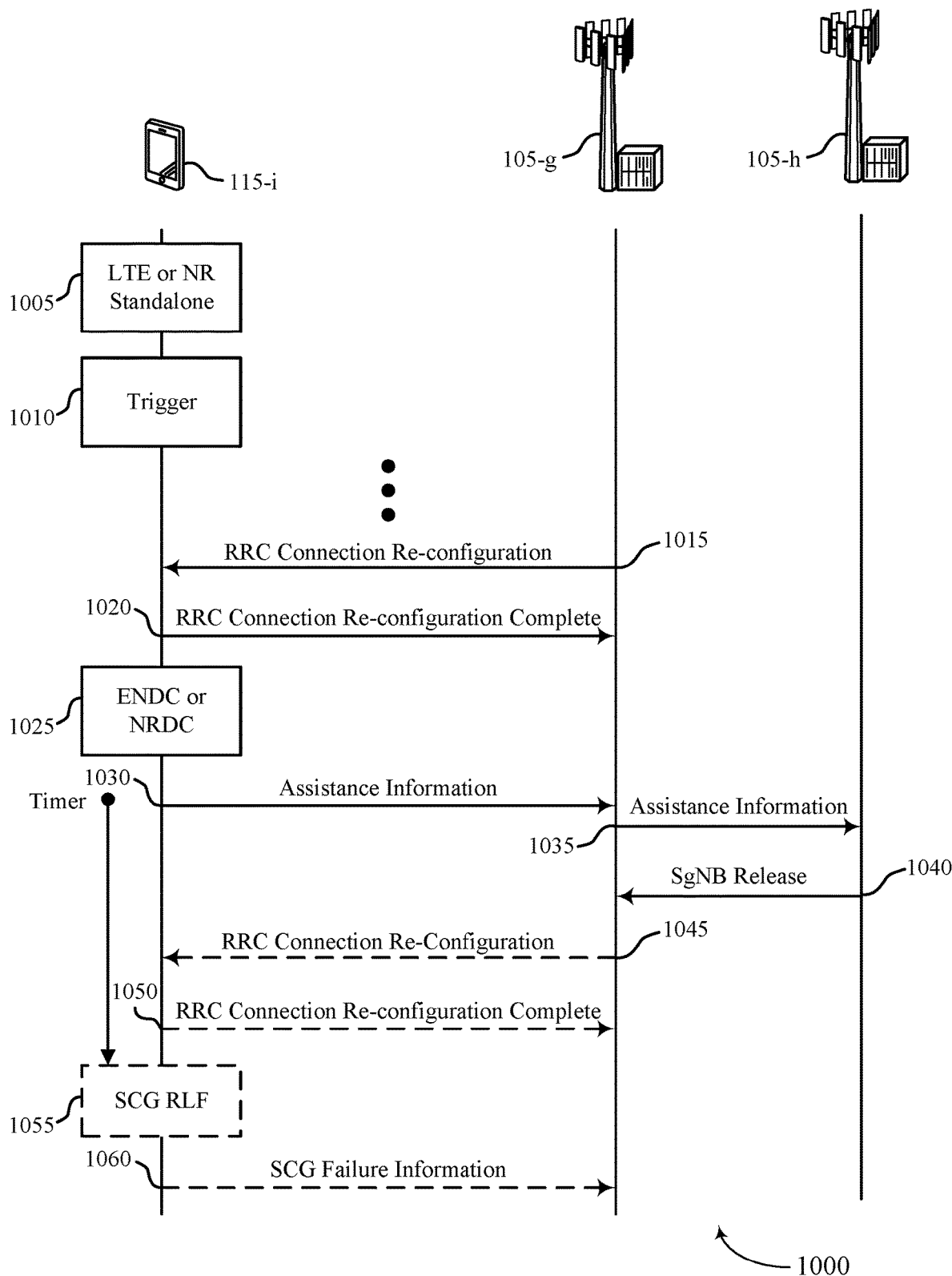

FIG. 10 illustrates an example of a process flow 1000 that supports techniques for providing assistance information for releasing an SCG in accordance with aspects of the present disclosure. The process flow 1000 illustrates DC non-standalone communication between a UE 115-*i*, a base station 105-*g* (which may function as a primary base station 105, such as an M-eNB) or an M-gNB), and a base station 105-*h* (which may function as a secondary base station 105, such as an S-gNB), which may be examples of corresponding devices as described herein, including with reference to FIGS. 1 and 2. For example, the UE 115-*i*, the base station 105-*g*, and the base station 105-*h* may enter or otherwise operate within an ENDC or an NRDC deployment. In some examples, the UE 115-*i* may enter or otherwise operate in the ENDC or NRDC deployment after detecting that a triggering condition is satisfied and may transmit assistance information associated with a configured maximum quantity of component carriers or a configured maximum aggregated bandwidth for a SCG based on detecting that the triggering condition is satisfied.

At 1005, the UE 115-*i* may operate in an LTE or an NR standalone deployment with the base station 105-*g*. For example, the UE 115-*i* may communicate with the base station 105-*g* and may refrain from simultaneously communicating with the base station 105-*h* or from communicating with the base station 105-*h* as a supplement to the base station 105-*g*.

At 1010, the UE 115-*i* may detect or otherwise determine that the UE 115-*i* satisfies a predetermined trigger threshold (or multiple predetermined trigger thresholds). For example, the UE 115-*i* may determine that the UE 115-*i* satisfies a first predetermined trigger threshold for transmitting assistance information associated with the maximum quantity of component carriers or the maximum aggregated bandwidth for the SCG. Additional details relating to such a predetermined trigger threshold are described herein, including with reference to FIG. 6.

At 1015, the UE 115-*i* may receive control signaling (such as RRC signaling, or RRC connection re-configuration signaling) from the base station 105-*g* including a command to enter an ENDC or an NRDC deployment involving the UE 115-*i*, the base station 105-*g*, and the base station 105-*h*. In some examples, the UE 115-*i* may receive the control signaling via an RRC(Connection)Reconfiguration(RRCReconfiguration) information element.

At 1020, the UE 115-*i* may accept the command to enter the ENDC or the NRDC deployment and may transmit control signaling (such as RRC signaling, or RRC connection re-configuration complete signaling). In some examples, the UE 115-*i* may transmit the control signaling via an RRC(Connection)ReconfigurationComplete(RRCReconfigurationComplete) information element.

At 1025, the UE 115-*i* may enter or otherwise operate in an ENDC or an NRDC deployment with the base station 105-*g* and the base station 105-*h* based on receiving the control signaling at 1015. For example, the UE 115-*i* may communicate with the base station 105-*g* as an M-eNB or an M-gNB and the UE 115-*i* may communicate with the base station 105-*f* as an S-gNB.

At 1030, the UE 115-*i* may transmit assistance information for the quantity of component carriers or the aggregated bandwidth for the SCG based on satisfying the predetermined trigger threshold. For instance, in examples in which the UE 115-*i* detects that the UE 115-*i* satisfies the first predetermined trigger threshold, the UE 115-*i* may transmit assistance information associated with the maximum quantity of component carriers or the maximum aggregated bandwidth for the SCG (as described in more detail with reference to FIG. 6). In such examples, the UE 115-*i* may transmit the assistance information via an ULInformationTransferMRDC(UEAssistanceInformation(maxBW-Preference, maxCC-Preference)) information element. In some aspects, the UE 115-*i* may request a release of the SCG in the ENDC or the NRDC deployment via the assistance information. For example, upon detecting that the condition to trigger the transmission of the assistance information is met and that the UE 115-*i* enters into the ENDC or the NRDC deployment, the UE 115-*i* may send the assistance information requesting a release of the SCG in the ENDC or the NRDC deployment.

In some examples, the UE 115-*i* may start a timer based on transmitting the assistance information. The timer may be configured at the UE 115-*i* by the base station 105-*g*, the base station 105-*h*, or the network. In some aspects, the timer may be referred to as or otherwise understood as a timer T_wait. The timer T_wait may define a time duration during which the UE 115-*i* expects to receive or otherwise monitors for control signaling (such as RRC re-configuration signaling) from the base station 105-*g* or the base station 105-*h* releasing the SCG.

At 1035, the base station 105-*g* may transmit the assistance information to the base station 105-*h*. For example, the base station 105-*g* may relay or otherwise forward the assistance information received from the UE 115-*i* to the base station 105-*h*. The base station 105-*g* may transmit the assistance information via an RRCTransfer(UEAssistanceInformation) information element.

At 1040, the base station 105-*h* may transmit, to the base station 105-*g*, signaling indicating an SgNB release (to satisfy the assistance information). For example, the assistance information provided by the UE 115-*i* may request that the configured maximum quantity of component carriers is reduced to zero or that the configured maximum aggregated bandwidth for the SCG is reduced to zero, which may cause or otherwise result in a determination at the base station 105-*h* that the SgNB may be released to satisfy the assistance information.

At 1045, in some implementations, the UE 115-*i* may receive control signaling from the base station 105-*g* based on the assistance information provided by the UE 115-*i*. In some examples, the control signaling may include RRC signaling, and the base station 105-*g* may transmit the control signaling via an RRCConnectionReconfiguration (nr-Config→Release) information element in the ENDC or an RRCReconfiguration(mrdc-SecondaryCellGroupConfig→Release) information element in the NRDC. In such examples, the control signaling may include a command to release the SCG from the ENDC or the NRDC deployment (e.g., in accordance with the request from the UE 115-*i* provided by the assistance information).

At 1050, in implementations in which the UE 115-*i* receives the control signaling at 1045, the UE 115-*i* may transmit control signaling to the base station 105-*g* completing the release of the SCG initiated by the base station 105-*g* at 1045. In some aspects, the UE 115-*i* may transmit the control signaling completing the re-configuration via an RRC(Connection)ReconfigurationComplete information element. In some examples, the UE 115-*i* may receive the control signaling including the command to release the SCG from the ENDC or the NRDC deployment prior to expiration of the timer T_wait and the UE **115-*i*, the base station 105-*g*, or the base station 105-*h* may end the procedure. In some other examples, however, the UE 115-*i* may fail to receive the control signaling including the command to release the SCG from the ENDC or the NRDC deployment prior to expiration of the timer T_wait and, in such examples, the UE 115-*i*** may initiate an RLF for the SCG.

At 1055, for example, the UE **115-*i* may initiate the RLF for the SCG basing on receiving the control signaling releasing the SCG from the base station 105-*g*** after expiration of the timer T_wait. In some examples, initiating the SCG RLF may include suspending the SCG (e.g., suspending communication with the SCG).

At 1060, the UE **115-*i* may transmit SCG failure information to the base station 105-*g* to inform the base station 105-*g* (e.g., the RAN) of the SCG RLF initiated at the UE 115-*i*. In some aspects, the UE 115-*i*** may transmit the SCG failure information via an SCGFailureInformationNR information element in the ENDC or an SCGFailureInformation information element in the NRDC.

Figure 11:
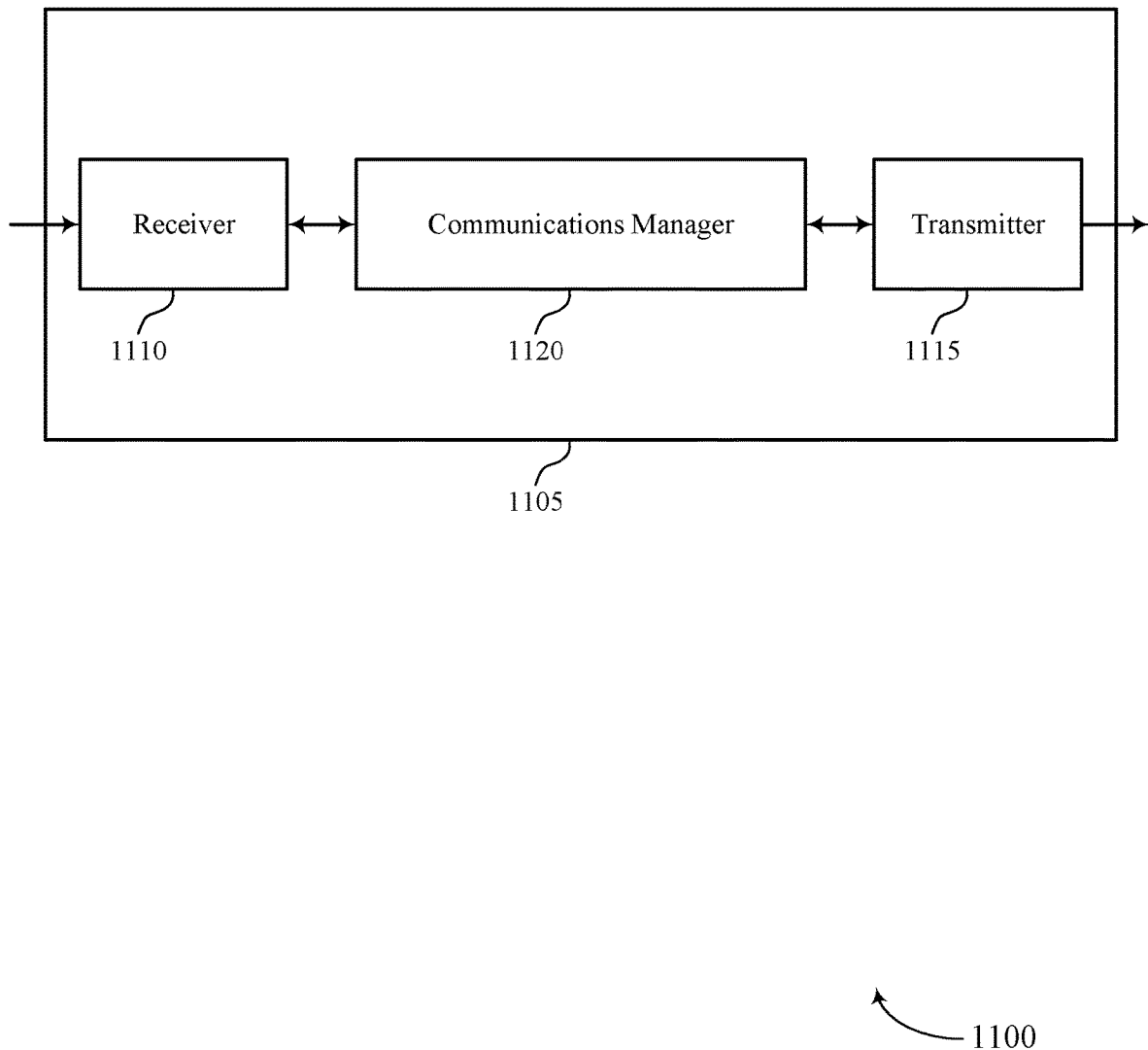
FIGS. 11 and 12 show block diagrams of devices that support techniques for providing assistance information for one or more communication parameters in accordance with aspects of the present disclosure.

FIG. 11 shows a block diagram 1100 of a device 1105 that supports techniques for providing assistance information for one or more communication parameters in accordance with aspects of the present disclosure. The device 1105 may be an example of aspects of a UE 115 as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the assistance information transmission features discussed herein. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for providing assistance information for one or more communication parameters). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for providing assistance information for reduced MIMO layers). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for providing assistance information for reduced MIMO layers as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. In some implementations, for example, the communications manager 1120 may be configured as or otherwise support a means for receiving, from a base station, a configuration for reporting assistance information based on a capability of the UE. The communications manager 1120 may be configured as or otherwise support a means for transmitting, to the base station, assistance information associated with a quantity of uplink MIMO layers based on the UE satisfying a predetermined trigger threshold (e.g., a first predetermined trigger threshold, assistance information associated with a quantity of uplink MIMO layers). The communications manager 1120 may be configured as or otherwise support a means for receiving, from the base station, control signaling indicating a re-configuration of the quantity of uplink MIMO layers based on the assistance information associated with the quantity of uplink MIMO layers.

Additionally or alternatively, the communications manager 1120 may be configured as or otherwise support a means for receiving, from a base station, a configuration for reporting assistance information based on a capability of the UE. The communications manager 1120 may be configured as or otherwise support a means for transmitting, to the base station, assistance information associated with a quantity of downlink MIMO layers based at least in part on the UE satisfying a predetermined trigger threshold (e.g., a second predetermined trigger threshold, which may be unique for assistance information associated with a quantity of downlink MIMO layers). The communications manager 1120 may be configured as or otherwise support a means for receiving, from the base station, control signaling indicating a re-configuration of the quantity of downlink MIMO layers based at least in part on the assistance information associated with the quantity of downlink MIMO layers.

Additionally or alternatively, the communications manager 1120 may be configured as or otherwise support a means for receiving, from a base station, a configuration for reporting assistance information based on a capability of the UE. The communications manager 1120 may be configured as or otherwise support a means for transmitting, to the base station, assistance information associated with a scheduling offset parameter based at least in part on the UE satisfying a predetermined trigger threshold (e.g., a second predetermined trigger threshold, which may be unique for assistance information associated with a scheduling offset parameter). The communications manager 1120 may be configured as or otherwise support a means for receiving, from the base station, control signaling indicating a re-configuration of the scheduling offset parameter based at least in part on the assistance information associated with the scheduling offset parameter.

Additionally or alternatively, the communications manager 1120 may be configured as or otherwise support a means for receiving, from a base station, a configuration for reporting assistance information based on a capability of the UE. The communications manager 1120 may be configured as or otherwise support a means for transmitting, to the base station, assistance information associated with one or both of a quantity of component carriers or an aggregated bandwidth allocation for an SCG based at least in part on the UE satisfying a predetermined trigger threshold (e.g., a second predetermined trigger threshold, which may be unique for assistance information associated with one or both of a quantity of component carriers or an aggregated bandwidth allocation for an SCG). The communications manager 1120 may be configured as or otherwise support a means for receiving, from the base station, control signaling indicating a re-configuration of one or both of the quantity of component carriers or the aggregated bandwidth allocation for the SCG based at least in part on the assistance information associated with one or both of the quantity of component carriers or the aggregated bandwidth allocation for the SCG.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, and more efficient utilization of communication resources.

Figure 12:
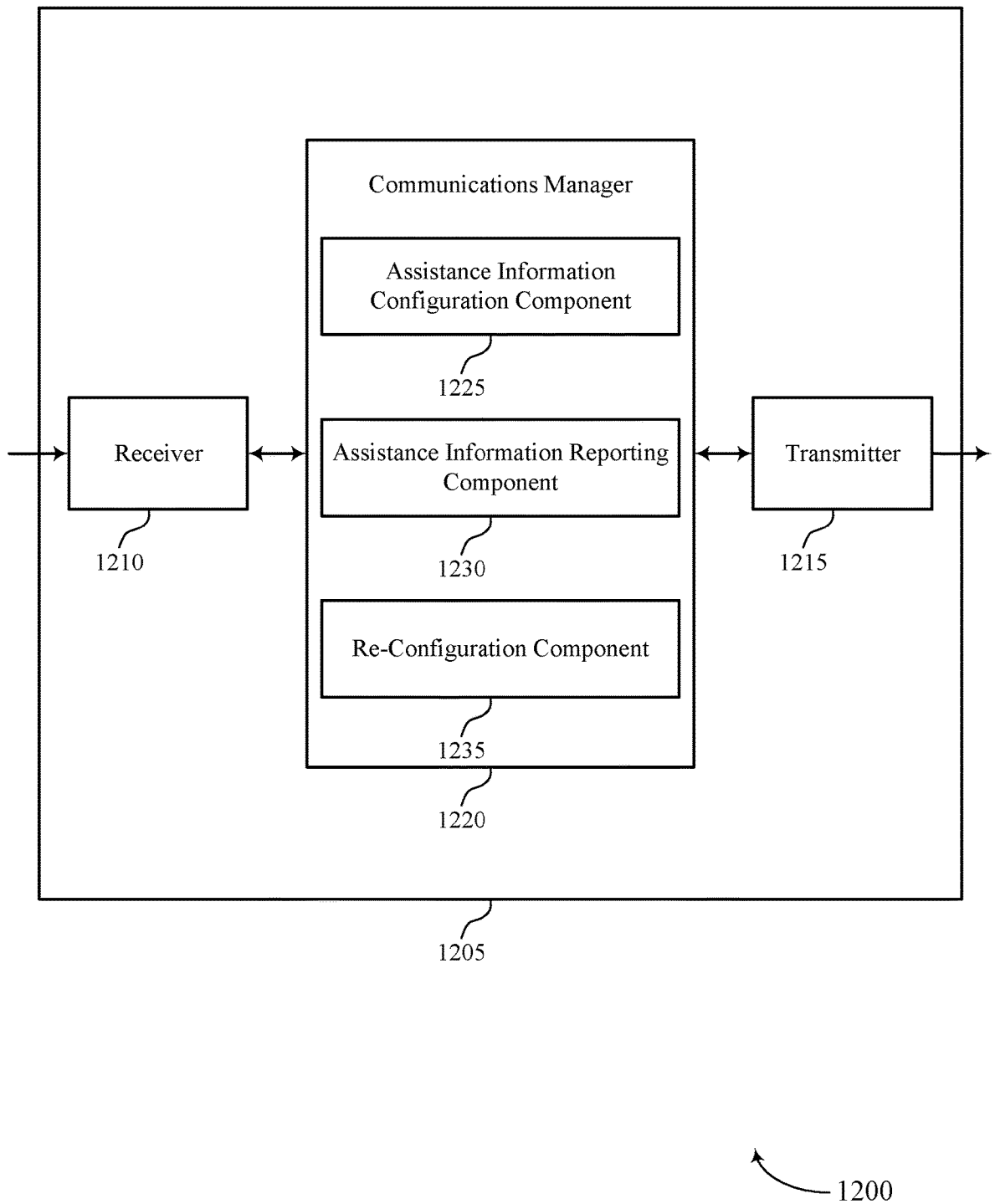

FIG. 12 shows a block diagram 1200 of a device 1205 that supports techniques for providing assistance information for one or more communication parameters in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for providing assistance information for a reduced quantity of uplink MIMO layers, a reduced quantity of downlink MIMO layers, an increased minimum scheduling offset, a reduced quantity of component carriers, or a reduced aggregated bandwidth for an SCG). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for providing assistance information for a reduced quantity of uplink MIMO layers, a reduced quantity of downlink MIMO layers, an increased minimum scheduling offset, a reduced quantity of component carriers, or a reduced aggregated bandwidth for an SCG). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for providing assistance information for reduced MIMO layers as described herein. For example, the communications manager 1220 may include an assistance information configuration component 1225, an assistance information reporting component 1230, a re-configuration component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. In some implementations, for example, the assistance information configuration component 1225 may be configured as or otherwise support a means for receiving, from a base station, a configuration for reporting assistance information based on a capability of the UE. The assistance information reporting component 1230 may be configured as or otherwise support a means for transmitting, to the base station, assistance information associated with a quantity of uplink MIMO layers based on the UE satisfying a predetermined trigger threshold. The re-configuration component 1235 may be configured as or otherwise support a means for receiving, from the base station, control signaling indicating a re-configuration of the quantity of uplink MIMO layers based on the assistance information associated with the quantity of uplink MIMO layers.

Additionally or alternatively, the assistance information configuration component 1225 may be configured as or otherwise support a means for receiving, from a base station, a configuration for reporting assistance information based on a capability of the UE. The assistance information reporting component 1230 may be configured as or otherwise support a means for transmitting, to the base station, assistance information associated with a quantity of downlink MIMO layers based at least in part on the UE satisfying a predetermined trigger threshold. The re-configuration component

1235 may be configured as or otherwise support a means for receiving, from the base station, control signaling indicating a re-configuration of the quantity of downlink MIMO layers based at least in part on the assistance information associated with the quantity of downlink MIMO layers.

Additionally or alternatively, the assistance information configuration component 1225 may be configured as or otherwise support a means for receiving, from a base station, a configuration for reporting assistance information based on a capability of the UE. The assistance information reporting component 1230 may be configured as or otherwise support a means for transmitting, to the base station, assistance information associated with a scheduling offset parameter based at least in part on the UE satisfying a predetermined trigger threshold. The re-configuration component 1235 may be configured as or otherwise support a means for receiving, from the base station, control signaling indicating a re-configuration of the scheduling offset parameter based at least in part on the assistance information associated with the scheduling offset parameter.

Additionally or alternatively, the assistance information configuration component 1225 may be configured as or otherwise support a means for receiving, from a base station, a configuration for reporting assistance information based on a capability of the UE. The assistance information reporting component 1230 may be configured as or otherwise support a means for transmitting, to the base station, assistance information associated with one or both of a quantity of component carriers or an aggregated bandwidth allocation for an SCG based at least in part on the UE satisfying a predetermined trigger threshold. The re-configuration component 1235 may be configured as or otherwise support a means for receiving, from the base station, control signaling indicating a re-configuration of one or both of the quantity of component carriers or the aggregated bandwidth allocation for the SCG based at least in part on the assistance information associated with one or both of the quantity of component carriers or the aggregated bandwidth allocation for the SCG.

In some cases, the assistance information configuration component 1225, the assistance information reporting component 1230, and the re-configuration component 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the assistance information configuration component 1225, the assistance information reporting component 1230, and the re-configuration component 1235 discussed herein. A transceiver processor may be collocated with or communicate with (e.g., direct the operations of) a transceiver of the device. A radio processor may be collocated with or communicate with (e.g., direct the operations of) a radio (e.g., an NR radio, an LTE radio, a Wi-Fi radio) of the device. A transmitter processor may be collocated with or communicate with (e.g., direct the operations of) a transmitter of the device. A receiver processor may be collocated with or communicate with (e.g., direct the operations of) a receiver of the device.

Figure 13:
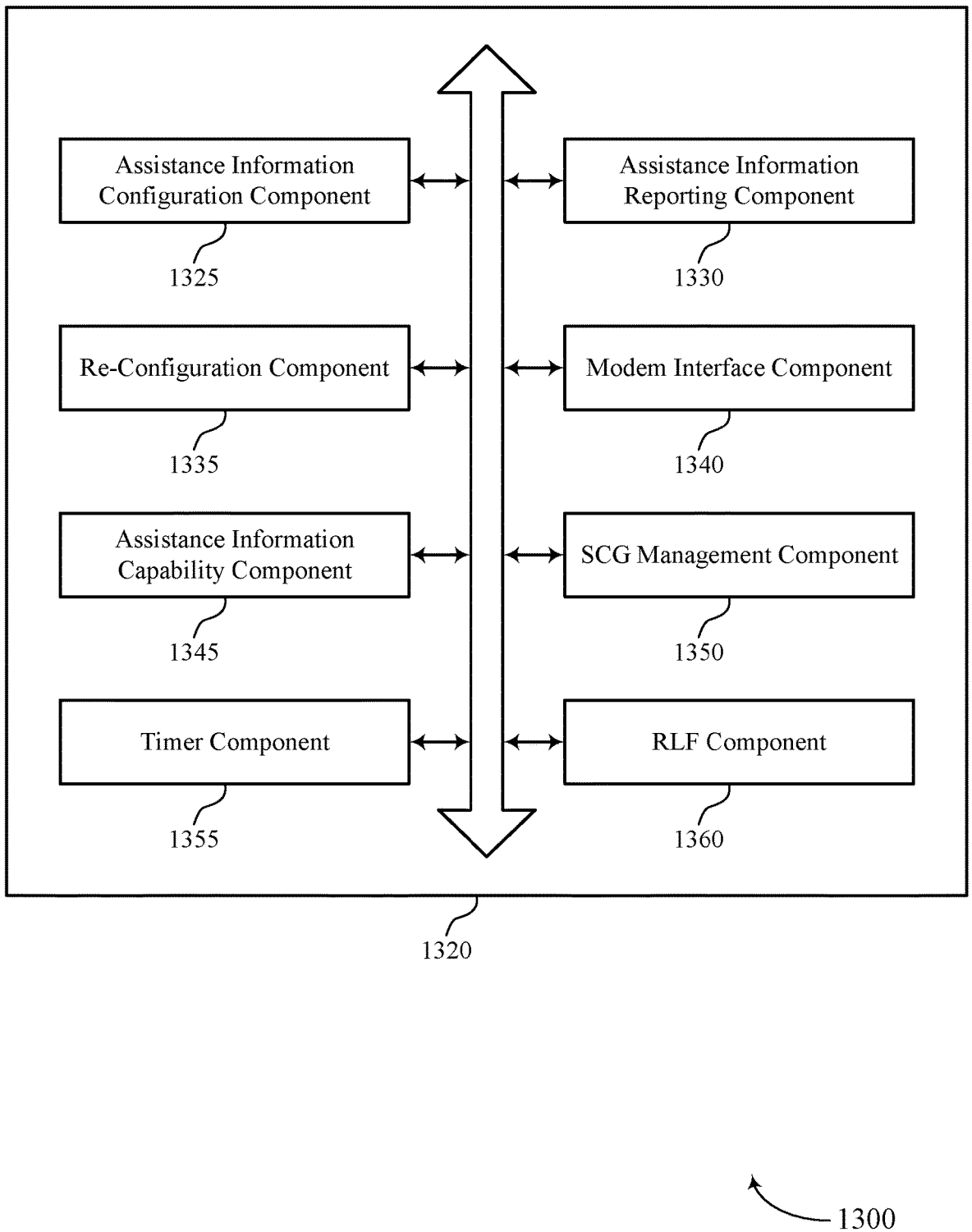
FIG. 13 shows a block diagram of a communications manager that supports techniques for providing assistance information for one or more communication parameters in accordance with aspects of the present disclosure.

FIG. 13 shows a block diagram 1300 of a communications manager 1320 that supports techniques for providing assistance information for one or more communication parameters in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for providing assistance information for reduced MIMO layers as described herein. For example, the communications manager 1320 may include an assistance information configuration component 1325, an assistance information reporting component 1330, a re-configuration component 1335, a modem interface component 1340, an assistance information capability component 1345, an SCG management component 1350, a timer component 1355, an RLF component 1360, or any combination thereof. Each of these components may communicate, directly or indirectly, with one another (e.g., via one or more buses).

The communications manager 1320 may support wireless communication at a UE in accordance with examples as disclosed herein. The assistance information configuration component 1325 may be configured as or otherwise support a means for receiving, from a base station, a configuration for reporting assistance information based on a capability of the UE. The assistance information reporting component 1330 may be configured as or otherwise support a means for transmitting, to the base station, assistance information associated with a quantity of uplink MIMO layers based on the UE satisfying a first predetermined trigger threshold. The re-configuration component 1335 may be configured as or otherwise support a means for receiving, from the base station, control signaling indicating a re-configuration of the quantity of uplink MIMO layers based on the assistance information associated with the quantity of uplink MIMO layers.

In some examples, to support transmitting the assistance information associated with the quantity of uplink MIMO layers, the assistance information reporting component 1330 may be configured as or otherwise support a means for transmitting an indication of a first quantity of uplink multiple-input multiple output layers less than a second quantity of uplink multiple-input multiple output layers associated with the capability of the UE. In some examples, the assistance information associated with the quantity of uplink MIMO layers requests a reduction from the second quantity of uplink multiple-input multiple output layers to the first quantity of uplink multiple-input multiple output layers.

In some examples, the modem interface component 1340 may be configured as or otherwise support a means for receiving, from an application of the UE via a modem control interface, an indication that the UE satisfies the first predetermined trigger threshold, where transmitting the assistance information associated with the quantity of uplink MIMO layers is based on the indication from the application of the UE. In some examples, the first predetermined trigger threshold includes at least a latency condition of an application of the UE being less than a threshold latency, or an uplink throughput from the UE being less than a threshold throughput, or an uplink BLER being above a threshold BLER, or an amount of data in a buffer being less than a threshold amount of data, or any combination thereof.

In some examples, the assistance information reporting component 1330 may be configured as or otherwise support a means for transmitting, to the base station, assistance information associated with a quantity of downlink MIMO layers based on the UE satisfying a second predetermined trigger threshold. In some examples, the re-configuration component 1335 may be configured as or otherwise support a means for receiving, from the base station, second control signaling indicating a re-configuration of the quantity of downlink MIMO layers based on the assistance information associated with the quantity of downlink MIMO layers.

In some examples, to support transmitting the assistance information associated with the quantity of downlink MIMO layers, the assistance information reporting component 1330 may be configured as or otherwise support a means for transmitting an indication of a first quantity of downlink multiple-input multiple output layers less than a second quantity of downlink multiple-input multiple output layers associated with the capability of the UE. In some examples, the assistance information associated with the quantity of downlink MIMO layers requests a reduction from the second quantity of downlink multiple-input multiple output layers to the first quantity of downlink multiple-input multiple output layers.

In some examples, the modem interface component 1340 may be configured as or otherwise support a means for receiving, from an application of the UE via a modem control interface, an indication that the UE satisfies the second predetermined trigger threshold, where transmitting the assistance information associated with the quantity of downlink MIMO layers is based on the indication from the application of the UE. In some examples, the second predetermined trigger threshold includes at least a latency condition of an application of the UE being less than a threshold latency, or a downlink throughput to the UE being less than a threshold throughput, or any combination thereof.

In some examples, the assistance information reporting component 1330 may be configured as or otherwise support a means for transmitting, to the base station, assistance information associated with a scheduling offset parameter based on the UE satisfying a second predetermined trigger threshold. In some examples, the re-configuration component 1335 may be configured as or otherwise support a means for receiving, from the base station, second control signaling indicating a re-configuration of the scheduling offset parameter based on the assistance information associated with the scheduling offset parameter.

In some examples, to support transmitting the assistance information associated with the scheduling offset parameter, the assistance information reporting component 1330 may be configured as or otherwise support a means for transmitting an indication of a first quantity of slots for the scheduling offset parameter greater than a second quantity of slots associated with the capability of the UE. In some examples, the assistance information associated with the scheduling offset parameter requests an increase from the second quantity of slots to the first quantity of slots for the scheduling offset parameter.

In some examples, the modem interface component 1340 may be configured as or otherwise support a means for receiving, from an application of the UE via a modem control interface, an indication that the UE satisfies the second predetermined trigger threshold, where transmitting the assistance information associated with the scheduling offset parameter is based on the indication from the application of the UE. In some examples, the second predetermined trigger threshold includes at least a latency condition of an application of the UE being less than a threshold latency.

In some examples, the assistance information reporting component 1330 may be configured as or otherwise support a means for transmitting, to the base station, assistance information associated with one or both of a quantity of component carriers or an aggregated bandwidth allocation for an SCG based on the UE satisfying a second predetermined trigger threshold. In some examples, the re-configuration component 1335 may be configured as or otherwise support a means for receiving, from the base station, second control signaling indicating a re-configuration of one or both of the quantity of component carriers or the aggregated bandwidth allocation for the SCG based on the assistance information associated with one or both of the quantity of component carriers or the aggregated bandwidth allocation for the SCG.

In some examples, to support transmitting the assistance information associated with the quantity of component carriers, the assistance information reporting component 1330 may be configured as or otherwise support a means for transmitting an indication of a first quantity of component carriers less than a second quantity of component carriers configured at the UE. In some examples, the assistance information associated with the quantity of component carriers requests a reduction from the second quantity of component carriers to the first quantity of component carriers.

In some examples, to support transmitting the assistance information associated with the aggregated bandwidth allocation for the SCG, the assistance information reporting component 1330 may be configured as or otherwise support a means for transmitting an indication of a first aggregated bandwidth allocation for the SCG less than a second aggregated bandwidth allocation for the SCG configured at the UE. In some examples, the assistance information associated with the aggregated bandwidth allocation for the SCG requests a reduction from the second aggregated bandwidth allocation for the SCG to the first aggregated bandwidth allocation for the SCG.

In some examples, the modem interface component 1340 may be configured as or otherwise support a means for receiving, from an application of the UE via a modem control interface, an indication to disable DC, where transmitting the assistance information associated with one or both of the quantity of component carriers or the aggregated bandwidth allocation for the SCG is based on the indication to disable DC. In some examples, to support receiving the re-configuration of one or both of the quantity of component carriers or the aggregated bandwidth allocation for the SCG, the SCG management component 1350 may be configured as or otherwise support a means for receiving a command to release the SCG.

In some examples, the timer component 1355 may be configured as or otherwise support a means for starting a timer based on transmitting the assistance information associated with one or both of the quantity of component carriers or the aggregated bandwidth allocation for the SCG. In some examples, the RLF component 1360 may be configured as or otherwise support a means for initiating a radio link failure for the SCG based on receiving the second control signaling indicating the re-configuration of one or both of the quantity of component carriers or the aggregated bandwidth allocation for the SCG after expiration of the timer. In some examples, the second predetermined trigger threshold includes at least an uplink throughput from the UE being less than a threshold uplink throughput, or a downlink throughput to the UE being less than a threshold downlink throughput, or an indication from an application of the UE that a display is off being received, or any combination thereof.

In some examples, the assistance information capability component 1345 may be configured as or otherwise support a means for transmitting, to the base station, signaling indicating the capability of the UE for the reporting of the assistance information, where receiving the configuration for the reporting of the assistance information is based on transmitting the signaling indicating the capability of the UE.

In some cases, the assistance information configuration component 1325, the assistance information reporting component 1330, the re-configuration component 1335, the modem interface component 1340, the assistance information capability component 1345, the SCG management component 1350, the timer component 1355, and the RLF component 1360 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the assistance information configuration component 1325, the assistance information reporting component 1330, the re-configuration component 1335, the modem interface component 1340, the assistance information capability component 1345, the SCG management component 1350, the timer component 1355, and the RLF component 1360 discussed herein.

Figure 14:
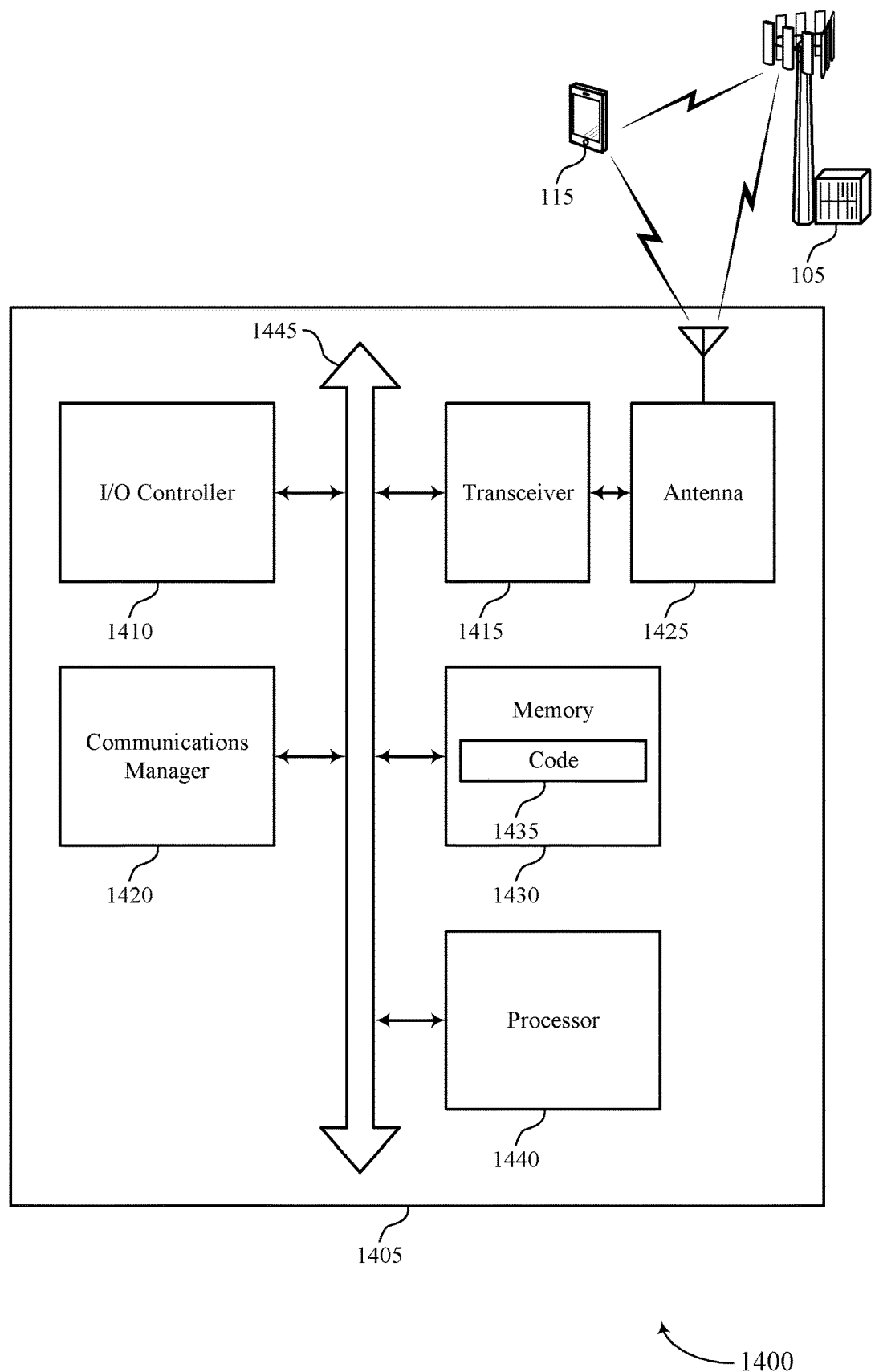
FIG. 14 shows a diagram of a system including a device that supports techniques for providing assistance information for one or more communication parameters in accordance with aspects of the present disclosure.

FIG. 14 shows a diagram of a system 1400 including a device 1405 that supports techniques for providing assistance information for one or more communication parameters in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for providing assistance information for reduced MIMO layers). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a UE in accordance with examples as disclosed herein. In some implementations, for example, the communications manager 1420 may be configured as or otherwise support a means for receiving, from a base station, a configuration for reporting assistance information based on a capability of the UE. The communications manager 1420 may be configured as or otherwise support a means for transmitting, to the base station, assistance information associated with a quantity of uplink MIMO layers based on the UE satisfying a first predetermined trigger threshold. The communications manager 1420 may be configured as or otherwise support a means for receiving, from the base station, control signaling indicating a re-configuration of the quantity of uplink MIMO layers based on the assistance information associated with the quantity of uplink MIMO layers.

Additionally or alternatively, the communications manager 1420 may be configured as or otherwise support a means for receiving, from a base station, a configuration for reporting assistance information based on a capability of the UE. The communications manager 1420 may be configured as or otherwise support a means for transmitting, to the base station, assistance information associated with a quantity of downlink MIMO layers based at least in part on the UE satisfying a predetermined trigger threshold (e.g., a second predetermined trigger threshold, which may be unique for assistance information associated with a quantity of downlink MIMO layers). The communications manager 1420 may be configured as or otherwise support a means for receiving, from the base station, control signaling indicating a re-configuration of the quantity of downlink MIMO layers based at least in part on the assistance information associated with the quantity of downlink MIMO layers.

Additionally or alternatively, the communications manager 1420 may be configured as or otherwise support a means for receiving, from a base station, a configuration for reporting assistance information based on a capability of the UE. The communications manager 1420 may be configured as or otherwise support a means for transmitting, to the base station, assistance information associated with a scheduling offset parameter based at least in part on the UE satisfying a predetermined trigger threshold (e.g., a second predetermined trigger threshold, which may be unique for assistance information associated with a scheduling offset parameter). The communications manager 1420 may be configured as or otherwise support a means for receiving, from the base station, control signaling indicating a re-configuration of the scheduling offset parameter based at least in part on the assistance information associated with the scheduling offset parameter.

Additionally or alternatively, the communications manager 1420 may be configured as or otherwise support a means for receiving, from a base station, a configuration for reporting assistance information based on a capability of the UE. The communications manager 1420 may be configured as or otherwise support a means for transmitting, to the base station, assistance information associated with one or both of a quantity of component carriers or an aggregated bandwidth allocation for an SCG based at least in part on the UE satisfying a predetermined trigger threshold (e.g., a second predetermined trigger threshold, which may be unique for assistance information associated with one or both of a quantity of component carriers or an aggregated bandwidth allocation for an SCG). The communications manager 1420 may be configured as or otherwise support a means for receiving, from the base station, control signaling indicating a re-configuration of one or both of the quantity of component carriers or the aggregated bandwidth allocation for the SCG based at least in part on the assistance information associated with one or both of the quantity of component carriers or the aggregated bandwidth allocation for the SCG.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for providing assistance information for a reduced quantity of uplink MIMO layers, a reduced quantity of downlink MIMO layers, an increased minimum scheduling offset, a reduced quantity of component carriers, or a reduced aggregated bandwidth for an SCG, or a combination thereof, as described herein, or the processor 1440 and the memory 1430 may be otherwise configured to perform or support such operations.

Figure 15:
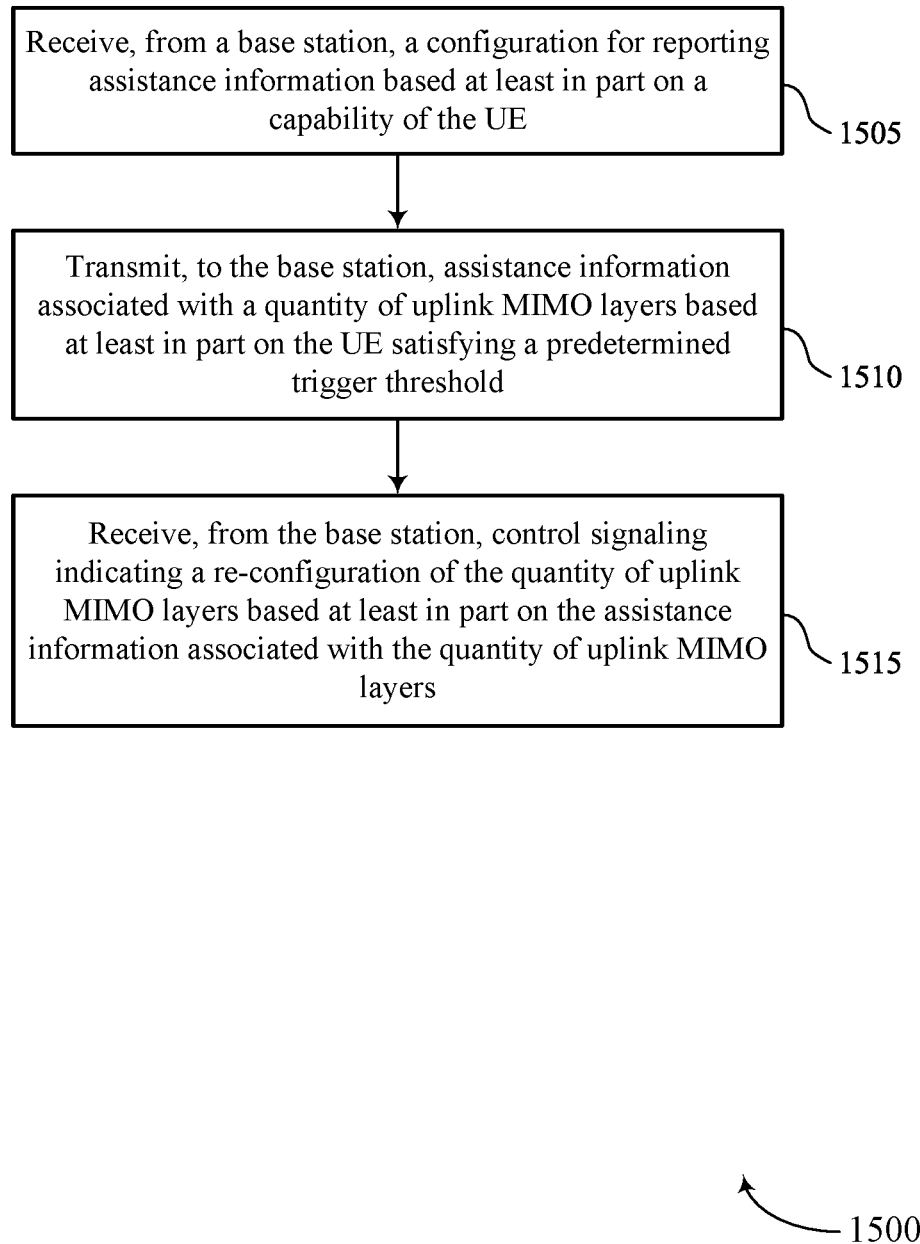
FIG. 15 shows a flowchart illustrating a method that supports techniques for providing assistance information for a reduced quantity of uplink MIMO layers in accordance with aspects of the present disclosure.

FIG. 15 shows a flowchart illustrating a method 1500 that supports techniques for providing assistance information for a reduced quantity of uplink MIMO layers in accordance with aspects of the present disclosure. The operations of the method 1500 may be implemented by a UE or its components as described herein. For example, the operations of the method 1500 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a configuration for reporting assistance information based on a capability of the UE. The operations of 1505 may be performed in accordance with examples as disclosed herein. In some examples, aspects of the operations of 1505 may be performed by an assistance information configuration component 1325 as described with reference to FIG. 13.

At 1510, the method may include transmitting, to the base station, assistance information associated with a quantity of uplink MIMO layers based on the UE satisfying a predetermined trigger threshold. The operations of 1510 may be performed in accordance with examples as disclosed herein. In some examples, aspects of the operations of 1510 may be performed by an assistance information reporting component 1330 as described with reference to FIG. 13.

At 1515, the method may include receiving, from the base station, control signaling indicating a re-configuration of the quantity of uplink MIMO layers based on the assistance information associated with the quantity of uplink MIMO layers. The operations of 1515 may be performed in accordance with examples as disclosed herein. In some examples, aspects of the operations of 1515 may be performed by a re-configuration component 1335 as described with reference to FIG. 13.

Figure 16:
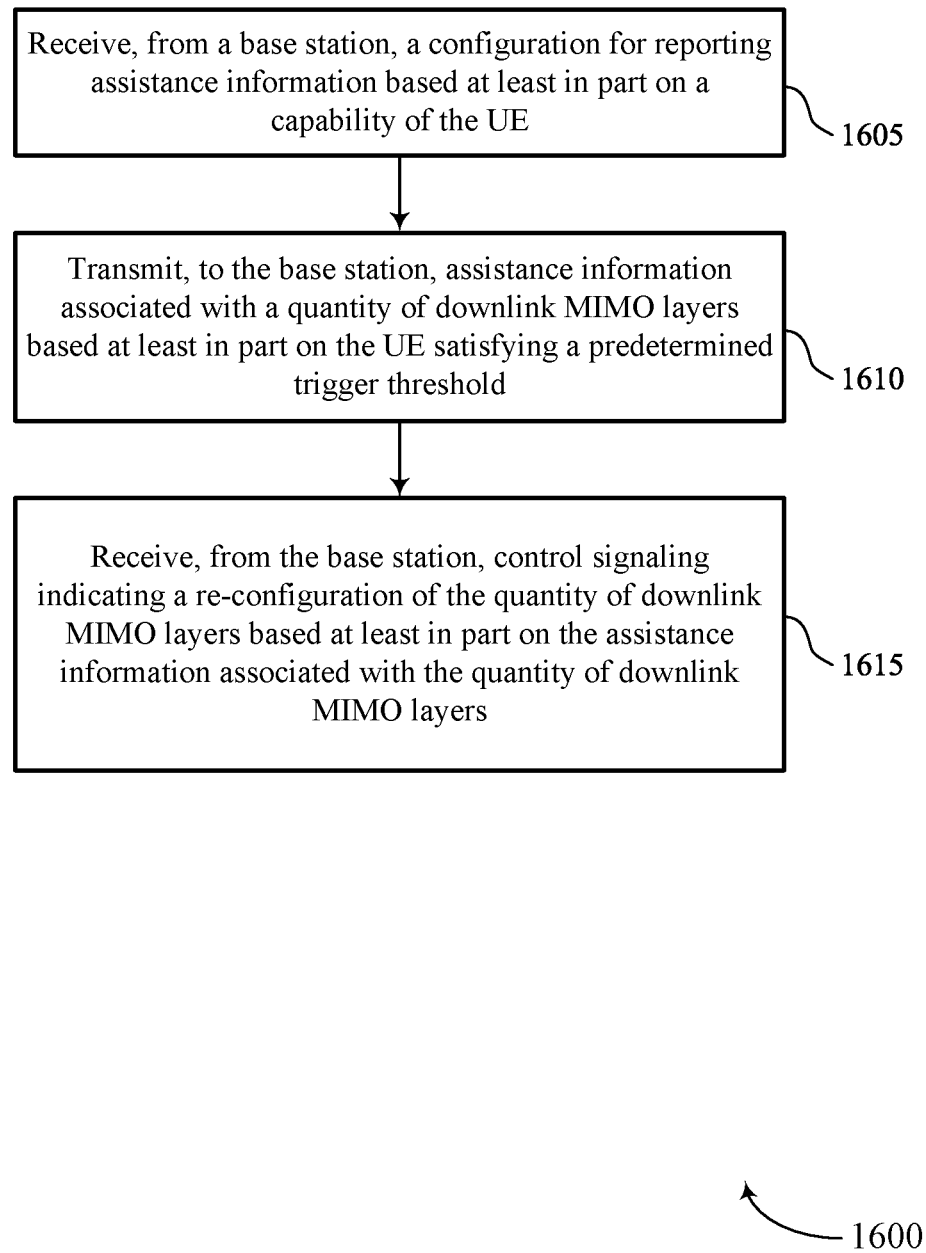
FIG. 16 shows a flowchart illustrating a method that supports techniques for providing assistance information for a reduced quantity of downlink MIMO layers in accordance with aspects of the present disclosure.

FIG. 16 shows a flowchart illustrating a method 1600 that supports techniques for providing assistance information for a reduced quantity of downlink MIMO layers in accordance with aspects of the present disclosure. The operations of the method 1600 may be implemented by a UE or its components as described herein. For example, the operations of the method 1600 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a configuration for reporting assistance information based on a capability of the UE. The operations of 1605 may be performed in accordance with examples as disclosed herein. In some examples, aspects of the operations of 1605 may be performed by an assistance information configuration component 1325 as described with reference to FIG. 13.

At 1610, the method may include transmitting, to the base station, assistance information associated with a quantity of downlink MIMO layers based on the UE satisfying a predetermined trigger threshold. The operations of 1610 may be performed in accordance with examples as disclosed herein. In some examples, aspects of the operations of 1610 may be performed by an assistance information reporting component 1330 as described with reference to FIG. 13.

At 1615, the method may include receiving, from the base station, control signaling indicating a re-configuration of the quantity of downlink MIMO layers based on the assistance information associated with the quantity of downlink MIMO layers. The operations of 1615 may be performed in accordance with examples as disclosed herein. In some examples, aspects of the operations of 1615 may be performed by a re-configuration component 1335 as described with reference to FIG. 13.

Figure 17:
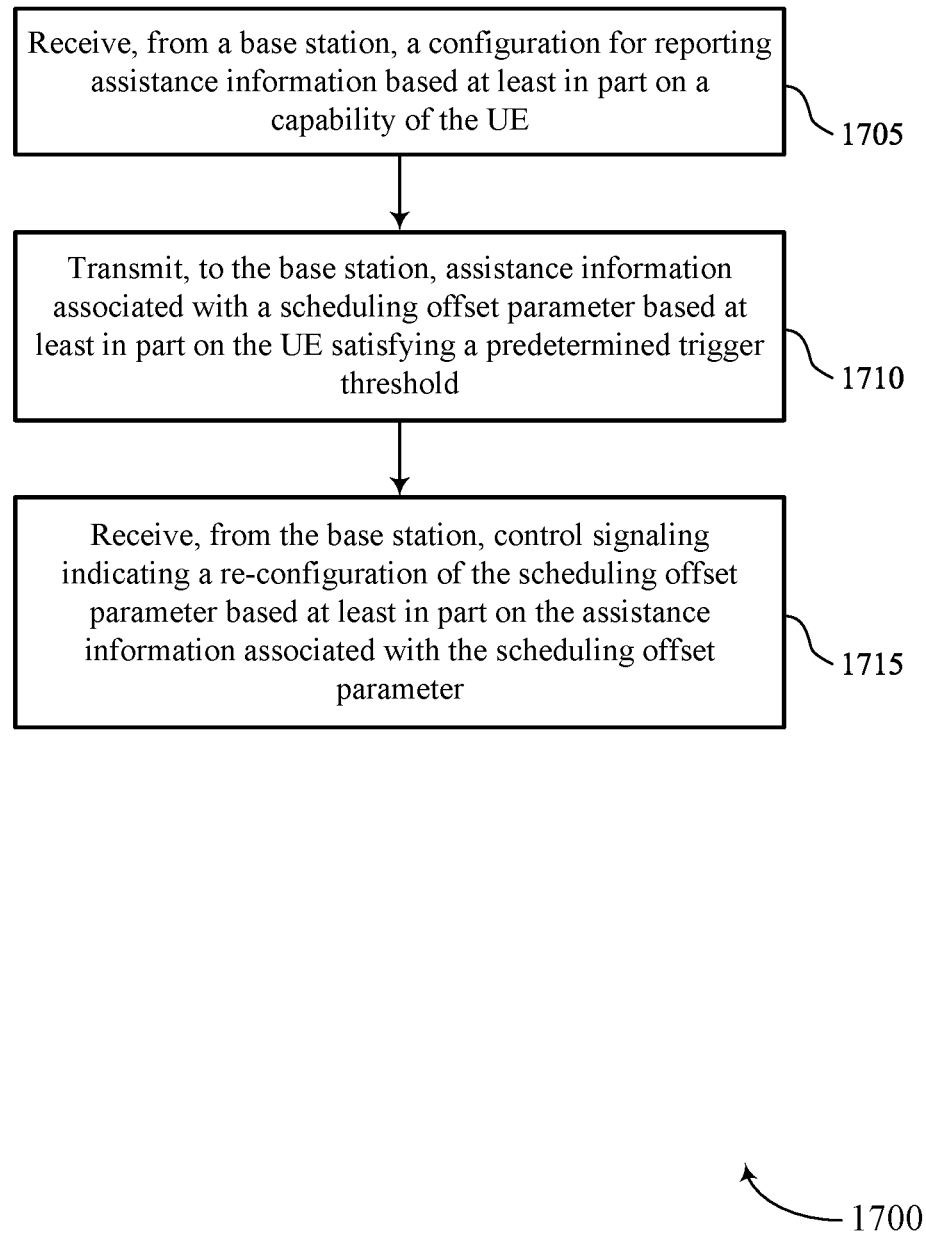
FIG. 17 shows a flowchart illustrating a method that supports techniques for providing assistance information for an increased minimum scheduling offset in accordance with aspects of the present disclosure.

FIG. 17 shows a flowchart illustrating a method 1700 that supports techniques for providing assistance information for an increased minimum scheduling offset in accordance with aspects of the present disclosure. The operations of the method 1700 may be implemented by a UE or its components as described herein. For example, the operations of the method 1700 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a configuration for reporting assistance information based on a capability of the UE. The operations of 1705 may be performed in accordance with examples as disclosed herein. In some examples, aspects of the operations of 1705 may be performed by an assistance information configuration component 1325 as described with reference to FIG. 13.

At 1710, the method may include transmitting, to the base station, assistance information associated with a scheduling offset parameter based on the UE satisfying a predetermined trigger threshold. The operations of 1710 may be performed in accordance with examples as disclosed herein. In some examples, aspects of the operations of 1710 may be performed by an assistance information reporting component 1330 as described with reference to FIG. 13.

At 1715, the method may include receiving, from the base station, control signaling indicating a re-configuration of the scheduling offset parameter based on the assistance information associated with the scheduling offset parameter. The operations of 1715 may be performed in accordance with examples as disclosed herein. In some examples, aspects of the operations of 1715 may be performed by a re-configuration component 1335 as described with reference to FIG. 13.

Figure 18:
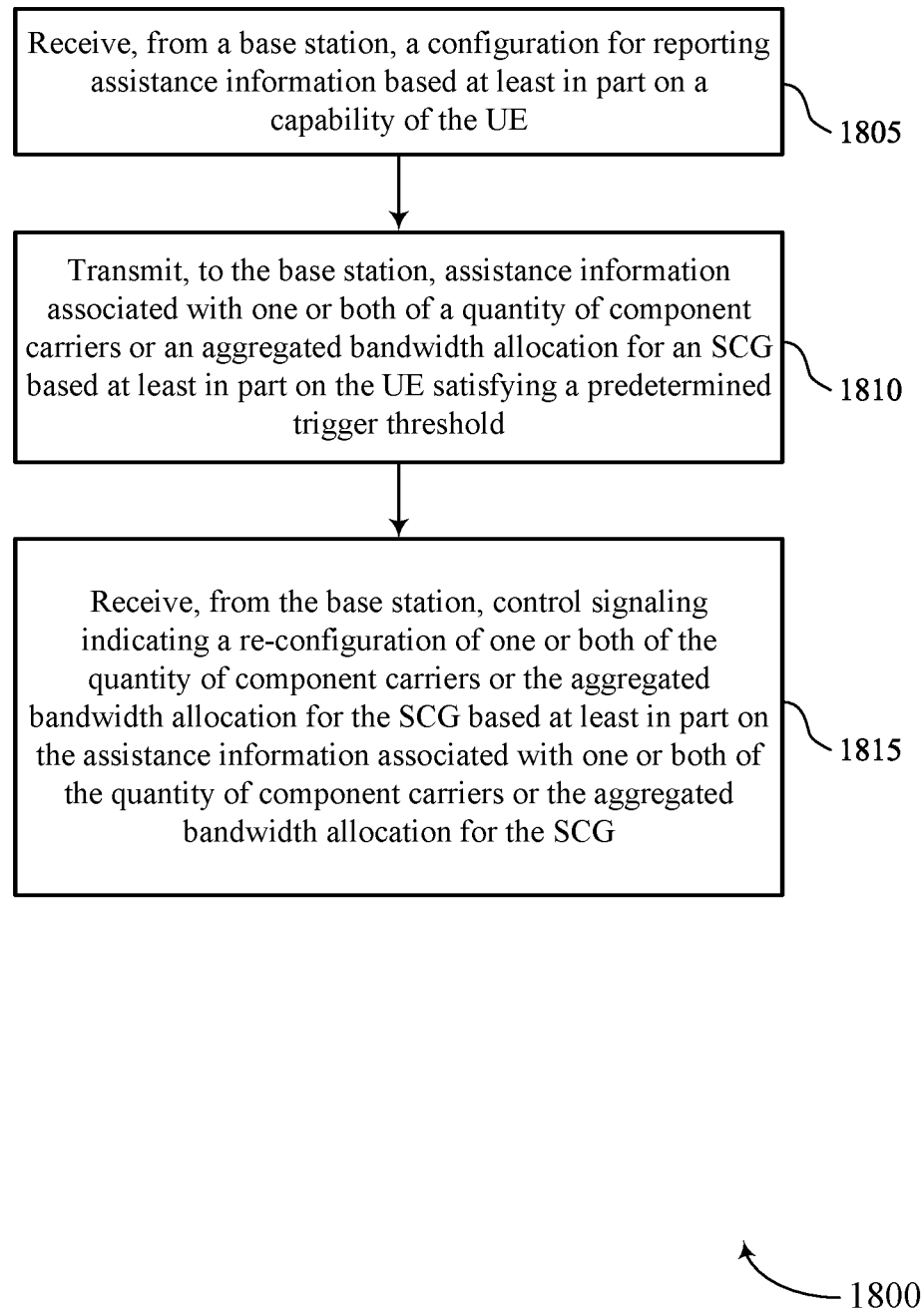
FIG. 18 shows a flowchart illustrating a method that supports techniques for providing assistance information for a reduced quantity of component carriers or a reduced aggregated bandwidth for an SCG in accordance with aspects of the present disclosure.

FIG. 18 shows a flowchart illustrating a method 1800 that supports techniques for providing assistance information for a reduced quantity of component carriers or a reduced aggregated bandwidth for an SCG in accordance with aspects of the present disclosure. The operations of the method 1800 may be implemented by a UE or its components as described herein. For example, the operations of the method 1800 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, a configuration for reporting assistance information based on a capability of the UE. The operations of 1805 may be performed in accordance with examples as disclosed herein. In some examples, aspects of the operations of 1805 may be performed by an assistance information configuration component 1325 as described with reference to FIG. 13.

At 1810, the method may include transmitting, to the base station, assistance information associated with one or both of a quantity of component carriers or an aggregated bandwidth allocation for an SCG based on the UE satisfying a predetermined trigger threshold. The operations of 1810 may be performed in accordance with examples as disclosed herein. In some examples, aspects of the operations of 1810 may be performed by an assistance information reporting component 1330 as described with reference to FIG. 13.

At 1815, the method may include receiving, from the base station, control signaling indicating a re-configuration of one or both of the quantity of component carriers or the aggregated bandwidth allocation for the SCG based on the assistance information associated with one or both of the quantity of component carriers or the aggregated bandwidth allocation for the SCG. The operations of 1815 may be performed in accordance with examples as disclosed herein. In some examples, aspects of the operations of 1815 may be performed by a re-configuration component 1335 as described with reference to FIG. 13.

The following provides an overview of aspects of the present disclosure:

Aspect 1: A method for wireless communication at a UE, comprising: receiving, from a base station, a configuration for reporting assistance information based at least in part on a capability of the UE; transmitting, to the base station, assistance information associated with a quantity of uplink MIMO layers based at least in part on the UE satisfying a first predetermined trigger threshold; and receiving, from the base station, control signaling indicating a re-configuration of the quantity of uplink MIMO layers based at least in part on the assistance information associated with the quantity of uplink MIMO layers.

Aspect 2: The method of aspect 1, wherein transmitting the assistance information associated with the quantity of uplink MIMO layers comprises: transmitting an indication of a first quantity of uplink MIMO layers less than a second quantity of uplink MIMO layers associated with the capability of the UE.

Aspect 3: The method of aspect 2, wherein the assistance information associated with the quantity of uplink MIMO layers requests a reduction from the second quantity of uplink MIMO layers to the first quantity of uplink MIMO layers.

Aspect 4: The method of any of aspects 1 through 3, further comprising: receiving, from an application of the UE via a modem control interface, an indication that the UE satisfies the first predetermined trigger threshold, wherein transmitting the assistance information associated with the quantity of uplink MIMO layers is based at least in part on the indication from the application of the UE.

Aspect 5: The method of any of aspects 1 through 4, wherein the first predetermined trigger threshold comprises at least a latency condition of an application of the UE being less than a threshold latency, or an uplink throughput from the UE being less than a threshold throughput, or an uplink BLER being above a threshold BLER, or an amount of data in a buffer being less than a threshold amount of data, or any combination thereof.

Aspect 6: The method of any of aspects 1 through 5, further comprising: transmitting, to the base station, assistance information associated with a quantity of downlink MIMO layers based at least in part on the UE satisfying a second predetermined trigger threshold; and receiving, from the base station, second control signaling indicating a re-configuration of the quantity of downlink MIMO layers based at least in part on the assistance information associated with the quantity of downlink MIMO layers.

Aspect 7: The method of aspect 6, wherein transmitting the assistance information associated with the quantity of downlink MIMO layers comprises: transmitting an indication of a first quantity of downlink MIMO layers less than a second quantity of downlink MIMO layers associated with the capability of the UE.

Aspect 8: The method of aspect 7, wherein the assistance information associated with the quantity of downlink MIMO layers requests a reduction from the second quantity of downlink MIMO layers to the first quantity of downlink MIMO layers.

Aspect 9: The method of any of aspects 6 through 8, further comprising: receiving, from an application of the UE via a modem control interface, an indication that the UE satisfies the second predetermined trigger threshold, wherein transmitting the assistance information associated with the quantity of downlink MIMO layers is based at least in part on the indication from the application of the UE.

Aspect 10: The method of any of aspects 6 through 9, wherein the second predetermined trigger threshold comprises at least a latency condition of an application of the UE being less than a threshold latency, or a downlink throughput to the UE being less than a threshold throughput, or any combination thereof.

Aspect 11: The method of any of aspects 1 through 10, further comprising: transmitting, to the base station, assistance information associated with a scheduling offset parameter based at least in part on the UE satisfying a second predetermined trigger threshold; and receiving, from the base station, second control signaling indicating a re-configuration of the scheduling offset parameter based at least in part on the assistance information associated with the scheduling offset parameter.

Aspect 12: The method of aspect 11, wherein transmitting the assistance information associated with the scheduling offset parameter comprises: transmitting an indication of a first quantity of slots for the scheduling offset parameter greater than a second quantity of slots associated with the capability of the UE.

Aspect 13: The method of aspect 12, wherein the assistance information associated with the scheduling offset parameter requests an increase from the second quantity of slots to the first quantity of slots for the scheduling offset parameter.

Aspect 14: The method of any of aspects 11 through 13, further comprising: receiving, from an application of the UE via a modem control interface, an indication that the UE satisfies the second predetermined trigger threshold, wherein transmitting the assistance information associated with the scheduling offset parameter is based at least in part on the indication from the application of the UE.

Aspect 15: The method of any of aspects 11 through 14, wherein the second predetermined trigger threshold comprises at least a latency condition of an application of the UE being less than a threshold latency.

Aspect 16: The method of any of aspects 1 through 15, further comprising: transmitting, to the base station, assistance information associated with one or both of a quantity of component carriers or an aggregated bandwidth allocation for an SCG based at least in part on the UE satisfying a second predetermined trigger threshold; and receiving, from the base station, second control signaling indicating a re-configuration of one or both of the quantity of component carriers or the aggregated bandwidth allocation for the SCG based at least in part on the assistance information associated with one or both of the quantity of component carriers or the aggregated bandwidth allocation for the SCG.

Aspect 17: The method of aspect 16, wherein transmitting the assistance information associated with the quantity of component carriers comprises: transmitting an indication of a first quantity of component carriers less than a second quantity of component carriers configured at the UE.

Aspect 18: The method of aspect 17, wherein the assistance information associated with the quantity of component carriers requests a reduction from the second quantity of component carriers to the first quantity of component carriers.

Aspect 19: The method of any of aspects 16 through 18, wherein transmitting the assistance information associated with the aggregated bandwidth allocation for the SCG comprises: transmitting an indication of a first aggregated bandwidth allocation for the SCG less than a second aggregated bandwidth allocation for the SCG configured at the UE.

Aspect 20: The method of aspect 19, wherein the assistance information associated with the aggregated bandwidth allocation for the SCG requests a reduction from the second aggregated bandwidth allocation for the SCG to the first aggregated bandwidth allocation for the SCG.

Aspect 21: The method of any of aspects 16 through 20, further comprising: receiving, from an application of the UE via a modem control interface, an indication to disable DC, wherein transmitting the assistance information associated with one or both of the quantity of component carriers or the aggregated bandwidth allocation for the SCG is based at least in part on the indication to disable DC.

Aspect 22: The method of any of aspects 16 through 21, wherein receiving the re-configuration of one or both of the quantity of component carriers or the aggregated bandwidth allocation for the SCG comprises: receiving a command to release the SCG.

Aspect 23: The method of any of aspects 16 through 22, further comprising: starting a timer based at least in part on transmitting the assistance information associated with one or both of the quantity of component carriers or the aggregated bandwidth allocation for the SCG; and initiating a radio link failure for the SCG based at least in part on receiving the second control signaling indicating the re-configuration of one or both of the quantity of component carriers or the aggregated bandwidth allocation for the SCG after expiration of the timer.

Aspect 24: The method of any of aspects 16 through 23, wherein the second predetermined trigger threshold comprises at least an uplink throughput from the UE being less than a threshold uplink throughput, or a downlink throughput to the UE being less than a threshold downlink throughput, or an indication from an application of the UE that a display is off being received, or any combination thereof.

Aspect 25: The method of any of aspects 1 through 24, further comprising: transmitting, to the base station, signaling indicating the capability of the UE for the reporting of the assistance information, wherein receiving the configuration for the reporting of the assistance information is based at least in part on transmitting the signaling indicating the capability of the UE.

Aspect 26: An apparatus for wireless communication at a UE, comprising a processor; memory coupled with the processor; and instructions stored in the memory and executable by the processor to cause the apparatus to perform a method of any of aspects 1 through 25.

Aspect 27: An apparatus for wireless communication at a UE, comprising at least one means for performing a method of any of aspects 1 through 25.

Aspect 28: A non-transitory computer-readable medium storing code for wireless communication at a UE, the code comprising instructions executable by a processor to perform a method of any of aspects 1 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a configuration for reporting assistance information based at least in part on a capability of the UE;
   transmitting, to the base station, assistance information associated with a quantity of uplink multiple-input multiple-output layers based at least in part on the UE satisfying a first predetermined trigger threshold, wherein the UE satisfying the first predetermined trigger threshold comprises at least an uplink block error rate being above a threshold block error rate, or an amount of data in a buffer at the UE being less than a threshold amount of data, or any combination thereof; and
   receiving, from the base station, control signaling indicating a re-configuration of the quantity of uplink multiple-input multiple-output layers based at least in part on the transmitted assistance information.

2. The method of claim 1, wherein transmitting the assistance information associated with the quantity of uplink multiple-input multiple-output layers comprises:
   transmitting an indication of a first quantity of uplink multiple-input multiple output layers less than a second quantity of uplink multiple-input multiple output layers associated with the capability of the UE.

3. The method of claim 2, wherein the assistance information associated with the quantity of uplink multiple-input multiple-output layers requests a reduction from the second quantity of uplink multiple-input multiple output layers to the first quantity of uplink multiple-input multiple output layers.

4. The method of claim 1, further comprising:
   receiving, from an application of the UE via a modem control interface, an indication that the UE satisfies the first predetermined trigger threshold, wherein transmitting the assistance information associated with the quantity of uplink multiple-input multiple-output layers is based at least in part on the indication from the application of the UE.

5. The method of claim 1, wherein the UE satisfying the first predetermined trigger threshold comprises a latency condition of an application of the UE being less than a threshold latency.

6. The method of claim 1, further comprising:
   transmitting, to the base station, assistance information associated with a quantity of downlink multiple-input multiple-output layers based at least in part on the UE satisfying a second predetermined trigger threshold; and
   receiving, from the base station, second control signaling indicating a re-configuration of the quantity of downlink multiple-input multiple-output layers based at least in part on the assistance information associated with the quantity of downlink multiple-input multiple-output layers.

7. The method of claim 6, wherein transmitting the assistance information associated with the quantity of downlink multiple-input multiple-output layers comprises:
   transmitting an indication of a first quantity of downlink multiple-input multiple output layers less than a second quantity of downlink multiple-input multiple output layers associated with the capability of the UE.

8. The method of claim 7, wherein the assistance information associated with the quantity of downlink multiple-input multiple-output layers requests a reduction from the second quantity of downlink multiple-input multiple output layers to the first quantity of downlink multiple-input multiple output layers.

9. The method of claim 6, further comprising:
   receiving, from an application of the UE via a modem control interface, an indication that the UE satisfies the second predetermined trigger threshold, wherein transmitting the assistance information associated with the quantity of downlink multiple-input multiple-output layers is based at least in part on the indication from the application of the UE.

10. The method of claim 6, wherein the UE satisfying the second predetermined trigger threshold comprises at least a second latency condition of an application of the UE being less than a threshold latency, or a downlink throughput to the UE being less than a threshold throughput, or any combination thereof.

11. The method of claim 1, further comprising:
    transmitting, to the base station, assistance information associated with a scheduling offset parameter based at least in part on the UE satisfying a second predetermined trigger threshold; and
    receiving, from the base station, second control signaling indicating a re-configuration of the scheduling offset parameter based at least in part on the assistance information associated with the scheduling offset parameter.

12. The method of claim 11, wherein transmitting the assistance information associated with the scheduling offset parameter comprises:
    transmitting an indication of a first quantity of slots for the scheduling offset parameter greater than a second quantity of slots associated with the capability of the UE.

13. The method of claim 12, wherein the assistance information associated with the scheduling offset parameter requests an increase from the second quantity of slots to the first quantity of slots for the scheduling offset parameter.

14. The method of claim 11, further comprising:
    receiving, from an application of the UE via a modem control interface, an indication that the UE satisfies the second predetermined trigger threshold, wherein transmitting the assistance information associated with the scheduling offset parameter is based at least in part on the indication from the application of the UE.

15. The method of claim 11, wherein the UE satisfying the second predetermined trigger threshold comprises at least a second latency condition of an application of the UE being less than a threshold latency.

16. The method of claim 1, further comprising:
    transmitting, to the base station, assistance information associated with one or both of a quantity of component carriers or an aggregated bandwidth allocation for a secondary cell group based at least in part on the UE satisfying a second predetermined trigger threshold; and
    receiving, from the base station, second control signaling indicating a re-configuration of one or both of the quantity of component carriers or the aggregated bandwidth allocation for the secondary cell group based at least in part on the assistance information associated with one or both of the quantity of component carriers or the aggregated bandwidth allocation for the secondary cell group.

17. The method of claim 16, wherein transmitting the assistance information associated with the quantity of component carriers comprises:
transmitting an indication of a first quantity of component carriers less than a second quantity of component carriers configured at the UE.

18. The method of claim 17, wherein the assistance information associated with the quantity of component carriers requests a reduction from the second quantity of component carriers to the first quantity of component carriers.

19. The method of claim 16, wherein transmitting the assistance information associated with the aggregated bandwidth allocation for the secondary cell group comprises:
transmitting an indication of a first aggregated bandwidth allocation for the secondary cell group less than a second aggregated bandwidth allocation for the secondary cell group configured at the UE.

20. The method of claim 19, wherein the assistance information associated with the aggregated bandwidth allocation for the secondary cell group requests a reduction from the second aggregated bandwidth allocation for the secondary cell group to the first aggregated bandwidth allocation for the secondary cell group.

21. The method of claim 16, further comprising:
receiving, from an application of the UE via a modem control interface, an indication to disable dual-connectivity, wherein transmitting the assistance information associated with one or both of the quantity of component carriers or the aggregated bandwidth allocation for the secondary cell group is based at least in part on the indication to disable dual-connectivity.

22. The method of claim 16, wherein receiving the re-configuration of one or both of the quantity of component carriers or the aggregated bandwidth allocation for the secondary cell group comprises:
receiving a command to release the secondary cell group.

23. The method of claim 16, further comprising:
starting a timer based at least in part on transmitting the assistance information associated with one or both of the quantity of component carriers or the aggregated bandwidth allocation for the secondary cell group; and
initiating a radio link failure for the secondary cell group based at least in part on receiving the second control signaling indicating the re-configuration of one or both of the quantity of component carriers or the aggregated bandwidth allocation for the secondary cell group after expiration of the timer.

24. The method of claim 16, wherein the UE satisfying the second predetermined trigger threshold comprises at least an uplink throughput from the UE being less than a threshold uplink throughput, or a downlink throughput to the UE being less than a threshold downlink throughput, or an indication from an application of the UE that a display is off being received, or any combination thereof.

25. The method of claim 1, further comprising:
transmitting, to the base station, signaling indicating the capability of the UE for the reporting of the assistance information, wherein receiving the configuration for the reporting of the assistance information is based at least in part on transmitting the signaling indicating the capability of the UE.

26. An apparatus for wireless communication at a user equipment (UE), comprising:
one or more processors;
memory coupled with the one or more processors; and
instructions stored in the memory and executable by the one or more processors to cause the apparatus to:
receive, from a base station, a configuration for reporting assistance information based at least in part on a capability of the UE;
transmit, to the base station, assistance information associated with a quantity of uplink multiple-input multiple-output layers based at least in part on the UE satisfying a first predetermined trigger threshold, wherein the UE satisfying the first predetermined trigger threshold comprises at least an uplink block error rate being above a threshold block error rate, or an amount of data in a buffer at the UE being less than a threshold amount of data, or any combination thereof; and
receive, from the base station, control signaling indicating a re-configuration of the quantity of uplink multiple-input multiple-output layers based at least in part on the transmitted assistance information.

27. The apparatus of claim 26, wherein the instructions are further executable by the one or more processors to cause the apparatus to:
transmit, to the base station, assistance information associated with a quantity of downlink multiple-input multiple-output layers based at least in part on the UE satisfying a second predetermined trigger threshold; and
receive, from the base station, second control signaling indicating a re-configuration of the quantity of downlink multiple-input multiple-output layers based at least in part on the assistance information associated with the quantity of downlink multiple-input multiple-output layers.

28. The apparatus of claim 26, wherein the instructions are further executable by the one or more processors to cause the apparatus to:
transmit, to the base station, assistance information associated with a scheduling offset parameter based at least in part on the UE satisfying a second predetermined trigger threshold; and
receive, from the base station, second control signaling indicating a re-configuration of the scheduling offset parameter based at least in part on the assistance information associated with the scheduling offset parameter.

29. An apparatus for wireless communication at a user equipment (UE), comprising:
means for receiving, from a base station, a configuration for reporting assistance information based at least in part on a capability of the UE;
means for transmitting, to the base station, assistance information associated with a quantity of uplink multiple-input multiple-output layers based at least in part on the UE satisfying a first predetermined trigger threshold, wherein the UE satisfying the first predetermined trigger threshold comprises at least an uplink block error rate being above a threshold block error rate, or an amount of data in a buffer at the UE being less than a threshold amount of data, or any combination thereof; and
means for receiving, from the base station, control signaling indicating a re-configuration of the quantity of uplink multiple-input multiple-output layers based at least in part on the transmitted assistance information.

30. A non-transitory computer-readable medium storing code for wireless communication at a user equipment (UE), the code comprising instructions executable by one or more processors to:
    receive, from a base station, a configuration for reporting assistance information based at least in part on a capability of the UE;
    transmit, to the base station, assistance information associated with a quantity of uplink multiple-input multiple-output layers based at least in part on the UE satisfying a first predetermined trigger threshold, wherein the UE satisfying the first predetermined trigger threshold comprises at least an uplink block error rate being above a threshold block error rate, or an amount of data in a buffer at the UE being less than a threshold amount of data, or any combination thereof; and
    receive, from the base station, control signaling indicating a re-configuration of the quantity of uplink multiple-input multiple-output layers based at least in part on the transmitted assistance information.

\* \* \* \* \*